(12) United States Patent
Yamamura

(10) Patent No.: US 6,434,152 B1
(45) Date of Patent: Aug. 13, 2002

(54) ATM NETWORK DEVICE

(75) Inventor: Shinya Yamamura, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/145,945

(22) Filed: Sep. 2, 1998

(30) Foreign Application Priority Data

Mar. 17, 1998 (JP) ............................................ 10-067316

(51) Int. Cl.[7] ............................................. H04L 12/28
(52) U.S. Cl. ................................ 370/395.2; 370/395.21
(58) Field of Search ................................ 370/231, 230, 370/235, 236, 389, 395, 399, 392, 466, 468, 465, 474, 381, 356, 395.1, 395.21, 236.2, 395.2

(56) References Cited

FOREIGN PATENT DOCUMENTS

JP          63-169854          7/1988
JP          4-188921           7/1992

*Primary Examiner*—Alpus H. Hsu
*Assistant Examiner*—Duc Ho
(74) *Attorney, Agent, or Firm*—Katten Muchin Zavis Rosenman

(57) ABSTRACT

A connection for transmitting an ATM cell having a specified identifier through a predetermined interface is set in an ATM switch unit. A protocol control unit receives a call control signaling message from a user via the ATM switch unit. Connection cache data retains connection information which specifies the connection set within the ATM switch unit and indicates whether the connection is in an activate or halt state. A connection cache unit, when the call control signaling message received by the protocol control unit indicates a request to release any one of connections, sets the connection information specifying the connection so as to indicate the halt state. The connection cache unit, when the call control signaling message received by the protocol control unit indicates a request to set the connection for a certain call, allocates the connection indicated by the connection information showing the halt state to the call.

12 Claims, 16 Drawing Sheets

ATM NETWORK DEVICE

BACKGROUND OF THE INVENTION

1. Field of the Invention

The present invention relates to an ATM network device and more particularly to an ATM network device capable of allocating a previously ensured (cached) channel with respect to a connection setting request given from a terminal.

2. Related Background Art

A method of setting a connection in an ATM (Asynchronous Transfer Mode) is classified into a PVC (Permanent Virtual Channel) for permanently setting a path and an SVC (Switched Virtual Channel) for dynamically setting the path.

The PVC is usable without an occurrence of overhead for setting the connection because of the connection remaining set. There is, however, such a defect that resources of the whole network can not be effectively utilized, because a QOS (Quality-of-Service) and a line bandwidth remains fixed.

Contrastingly in the SVC, although there might occur the overhead for setting the connection, the QOS and the bandwidth to be used can be freely set, and a route within the network can be changed with a flexibility corresponding to a traffic. If short-time communications frequently occur, it might take much overhead time for setting the connection, and consequently a proportion of the connection setting time to a content transfer time becomes large.

As explained above, the PVC and the SVC have their own merits and demerits and used separately corresponding to purposes of the connections. For instance, if the ATM is used in a public network used by users requiring a diversified applications, the connections are set as the SVC.

By contrast, if the ATM network is utilized as a backbone for an INTERNET or an INTRANET, it can be considered that there might always occur a request for setting the connections having the same connection attributes (the QOS, a using bandwidth and a terminal to be connected, etc). In such a utilizing condition, there becomes a smaller load upon the network by setting the connection as the PVC.

Even in such a using condition, however, the bandwidth of each PVC is set corresponding to a traffic peak, and therefore, if the traffic largely fluctuates depending on the time, a large-capacity physical line corresponding thereto must be ensured. Accordingly, a tremendous investment must be put into the network resources.

Even so, when the connection is set based on the SVC, it follows that the request for setting the connections exhibiting absolutely the same attributes is repeated many times at a high-traffic time despite becoming flexible to the traffic fluctuations, with the result that a processing load on the whole network becomes large.

SUMMARY OF THE INVENTION

To overcome the above-described problems, it is a primary object of the present invention to provide an ATM network device capable of actualizing merits of both of an SVC and a PVC, effectively utilizing resources of a whole network by releasing connections when a traffic congestion is small, and besides, even if a request for setting the connections having absolutely the same attribute is repeated any number of times, decreasing an overhead time.

The ATM network device according to the present invention adopts following constructions in order to obviate the problems described above.

According to a first aspect of the present invention, an ATM network device comprises an ATM switch unit in which a connection for transmitting an ATM cell having a specified identifier through a predetermined interface is set, a message receiving unit for receiving via the ATM switch unit a call control signaling message transmitted from outside, a connection information retaining unit for retaining, per connection, connection information which specifies the connection set in the ATM switch unit, and indicates whether the specified connection is in an activated state or in a halt state, a connection management unit which makes, when a call control signaling message received by the message receiving unit indicates a request to release a connection from a call, a change so that the connection information specifying the connection of which release is requested indicates the halt state, also making, when a call control signaling message received by the message receiving unit indicates a request for setting a connection for another new call, a change so that any piece of connection information indicating the halt state indicates the activated state, and allocating a connection specified by this piece of connection information to the new call.

With this construction, when the call control signaling message indicating a request for setting a connection is transmitted from a terminal, the connection management unit checks whether or not there exists the connection information which indicates the halt state among pieces of connection information retained by the connection information retaining unit. Then, if there exists the connection information indicating the halt state, the connection management unit allocates the connection specified by the connection information indicating the halt state to the call which is requested to be set with a connector through the call control signaling message, and changes the connection information on the allocated connection so as to indicate the activated state. Thereafter, when the call control signaling message indicating a request to release the call from the connection is transmitted from the terminal, the connection management unit changes the connection information specifying the connection of which release is requested so as to indicate the halt state. Thereafter, when the call control signaling message indicating the request for setting the connection is transmitted from the terminal or another one, the connection management unit allocates the connection of which connection information indicates the halt state, to a new call which is requested to be set with a connection through this call control signaling message. Thus, the connection set in the ATM switch unit continues to be cached by the connection information in the connection information retaining unit. As described above, it might be sufficient to simply allocate the connection in response to the connection setting request, and hence there occurs a less amount of overhead than by newly setting the connection. Further, the connection is brought into the halt state with respect to the connection release request, however, the connection set in the halt state is allocated to other call, whereby the resources of the whole network can be effectively utilized.

According to a second aspect of the present invention, in the ATM network device according to the first aspect, the connection information indicates an identifier used for the specified connection, and the connection management unit allocates the connection to the new call by imparting the identifier used for the connection to the ATM cell belonging to the call.

According to a third aspect of the present invention, in the ATM network device according to the first aspect, if there is no connection information indicating the halt state when the call control message received by the message receiving unit shows the request for setting the connection for the new call, the connection management unit sets a new connection in the ATM switch unit, and allocates this new connection to the call.

With this construction, the new connection can be set.

According to a fourth aspect of the present invention, in the ATM network device according to the third aspect, when newly setting the connection in the ATM switch unit, the connection management unit registers the connection information retaining unit with new connection information specifying the newly set connection.

When thus constructed, even if the new connection is set, this new connection can be managed through the connection information, and it is therefore feasible to set the connection in the halt state when the release of the connection is requested and to allocate the connection to other call.

According to a fifth aspect of the present invention, in the ATM network device according to the fourth aspect, the connection information retaining unit further retains upper limit bandwidth information defining an upper limit of a total sum of bandwidths of all the connections specified by the respective retained pieces of connection information, and the connection management unit registers the connection information retaining unit with the connection information specifying the newly set connection as far as the total sum of bandwidths of all the connections specified by the respective pieces of connection information retained by the connection information retaining unit, falls within the upper limit defined by the upper limit bandwidth information.

When constructed in this way, since the registration of the new connection can be restricted, it is possible to ensure a room for enabling the connection to be newly set with respect to a call to which the connection kept in the halt state can not be allocated for the reason of a difference between the connection attributes etc.

According to a sixth aspect of the present invention, in the ATM network device according to the fourth aspect, each piece of connection information indicates an attribute of the specified connection, the connection information retaining unit further retains per classification of the attribute the upper limit bandwidth information defining the upper limit of the total sum of bandwidths of the connections specified by the respective retained pieces of connection information, and the connection management unit registers the connection information retaining unit with the connection information specifying the newly set connection as far as the total sum of bandwidths of the connections specified by the connection information indicating the same attribute as that of the newly set connection, falls within the upper limit defined by the upper limit bandwidth information on this attribute.

If thus constructed, the upper limit of the bandwidth can be set per connection attribute, and hence an elaborate connection management can be done.

According to a seventh aspect of the present invention, in the ATM network device according to the first aspect, the connection information retaining unit further retains release condition information indicating a condition for releasing the connection specified by the retained piece of connection information, and the connection management unit deletes any one piece of connection information out of the connection information retaining unit in accordance with the condition indicated by the release condition information.

With this construction, it is feasible to release the connection of which connection information needs not to be registered, whereby the resources of the whole network can be effectively utilized.

According to an eighth aspect of the present invention, in the ATM network device according to the first aspect, each piece of connection information indicates an attribute of the specified connection, the connection information retaining unit further retains per classification of the attribute the release condition information for indicating a condition for releasing the connection specified by the retained piece of connection information, and the connection management unit deletes any one piece of connection information out of the connection information retaining unit in accordance with the condition indicated by the release condition information.

When constructed in this manner, the release condition can be set per connection attribute, and therefore the elaborate connection management can be performed.

According to a ninth aspect of the present invention, in the ATM network device according to the first aspect, after the message receiving unit has received the call control signaling message for indicating a request to release a connection from a call, and when the ATM cell belonging to this call flows into the ATM switch unit, the connection management unit releases the connection having been allocated to this call.

If thus constructed, it is possible to effectively prevent the user from an invalid utilization of the connection.

According to a tenth aspect of the present invention, in the ATM network device according to the first aspect, the connection set in the ATM switch unit is a permanent virtual channel set between two ATM networks.

According to an eleventh aspect of the present invention, in the ATM network device according to the first aspect, the connection set in the ATM switch unit is a switched virtual channel set with respect to other ATM network.

According to a twelfth aspect of the present invention, the ATM network device according to the eleventh aspect may further comprise a message transmitting unit for transmitting a message for requesting the connection management unit of the other ATM network device to change, when the connection management unit has changed a connection information for specifying a connection so as to indicate the halt state, a connection information for specifying the connection so as to indicate the halt state, and transmitting a message requesting the connection management unit of the other ATM network device to change, when the connection management unit has changed a connection information for specifying a connection so as to indicate the activated state, a connection information for specifying the connection so as to indicate the activated state.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Other objects and advantages of the present invention will become apparent during the following discussion in conjunction with the accompanying drawings, in which.

DESCRIPTION OF THE PREFERRED EMBODIMENTS

Embodiments of the present invention will hereinafter be described with reference to the accompanying drawings.

First Embodiment
(Construction of ATM Network Device)

Figure 1:
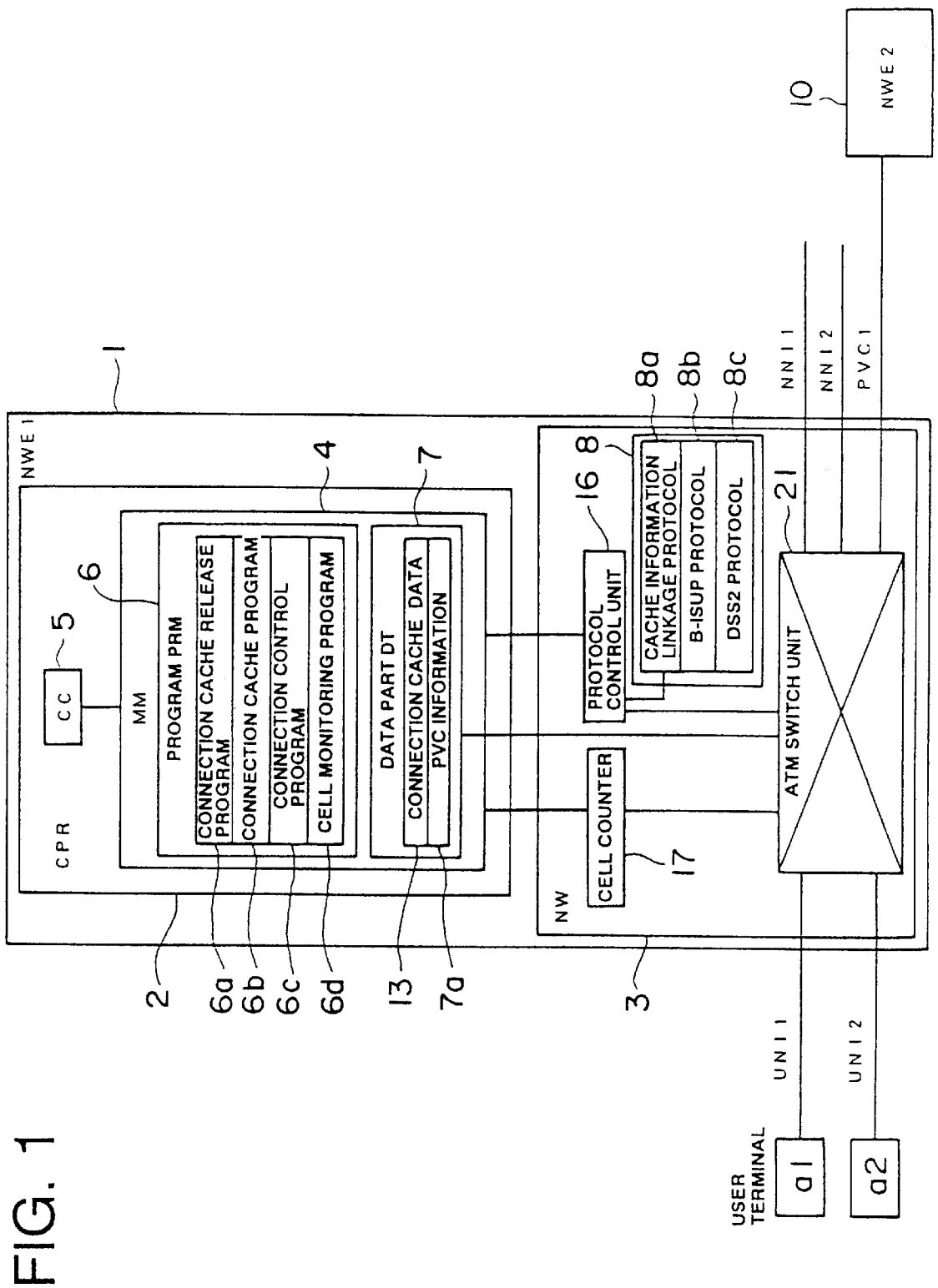
FIG. 1 is a block diagram illustrating a hardware configuration of an ATM network device in a first embodiment of the present invention.

FIG. 1 is a block diagram schematically showing a hardware construction of an ATM network device (an ATM switch or an ATM router). As obvious from FIG. 1, this ATM network device (NWE1) 1 is constructed of a network control unit (NW) 3 for controlling a line and a call control processor (CPR) 2.

The network control unit 3 is constructed of an ATM switch unit 21 accommodating interfaces (UNIs <User Network Interfaces> for connections to user terminals a1, a2, and NNIs <Network-to-Network interfaces> for connections to any other ATM network devices, a cell counter 17 connected to the ATM switch unit 21 and to the call control processor 2, a protocol control unit 16 likewise connected to the unit 21 and to the processor 2, and a protocol retaining memory 8 connected to this protocol control unit 16.

The ATM switch unit 21 routes the ATM cell transmitted through each interface via a route corresponding to a VC identifier (VPI: Virtual Path Identifier/VCI: Virtual Channel Identifier) contained in a header thereof in accordance with an indication given from the call control processor 2, thereby sending the ATM cell to any one of the interfaces. Further, the ATM switch unit 21 transfers a call control signaling message addressed to own device and received through any one of the interfaces to the protocol control unit 16. The ATM switch unit 21 also forwards a call control signaling message received from the protocol control unit 16 to a destination thereof through any one of the interfaces. Moreover, the ATM switch unit 21 executes a managing process of a flow rate of the ATM cells and a control process of a path for connection.

Note that a PVC 1 shown in FIG. 1 is a permanent virtual channel (PVC) set between the ATM switch unit 21 and any other ATM network device (NWE 2), i.e., a "counter-station network device" (through any one of the NNIs) in order to transmit and receive (the call control signaling message about) cache connection linkage information which will be mentioned later on.

The cell counter 17 is classified as a hardware counter for counting the number of ATM cells received by the ATM switch unit 21 per VC identifier (VCI). The call control processor 2 is notified of a result of counting by the cell counter 17.

The protocol retaining memory 8 is a memory for retaining a B-ISUP protocol 8b defined as an NNI interface protocol, a DSS2 protocol 8c as an UNI interface protocol, and a cache information linkage protocol 8a as a protocol for transmitting and receiving cache connection linkage information via the PVC 1, which will be mentioned later on.

The protocol control unit 16 serving as a message receiving unit as well as a message transmitting unit, extracts the call control signaling message from the ATM cell flowing into the ATM switch unit 21, and reads the call control protocol used for transmitting and receiving the extracted call control signaling message out of the protocol retaining memory 8. The protocol control unit 16 then formalizes the call control signaling message with reference to the read call control protocol, and notifies the call control processor 2 of the formalized call control signaling message (which corresponds to the message receiving unit). Further, the protocol control unit 16 disassembles the call control signaling message of which the call control processor 2 has notified into cells accordance with the call control protocol read from the protocol retaining memory 8, corresponding to a type of the interface to which the message is forwarded, and sends the message in the cells to the ATM switch unit 21 (which corresponds to the message transmitting unit).

The call control processor 2 manages a transaction (a temporal data area retained during only a period for which the call remains connected) needed for the connection between the terminals, and also manages a connected state of this connection. This call control processor 2 essentially consists of a central controller (cc) 5 and a main memory (MM) 4 in which a an operating area for this central controller 5 is developed. The operating area developed in this main memory 4 contains a program part (PRM) 6 for retaining a program executed by the central controller 5 in order to implement the managements described above, and a data part (DT) 7 for retaining the data for the above managements. The program retained in the program part 6 includes a connection control program 6c, a connection cache program 6b, a connection cache release program 6a, and a cell monitoring program 6d. Further, the data retained in the data part 7 includes cache connection data 13 and PVC information 7a.

Figure 2:
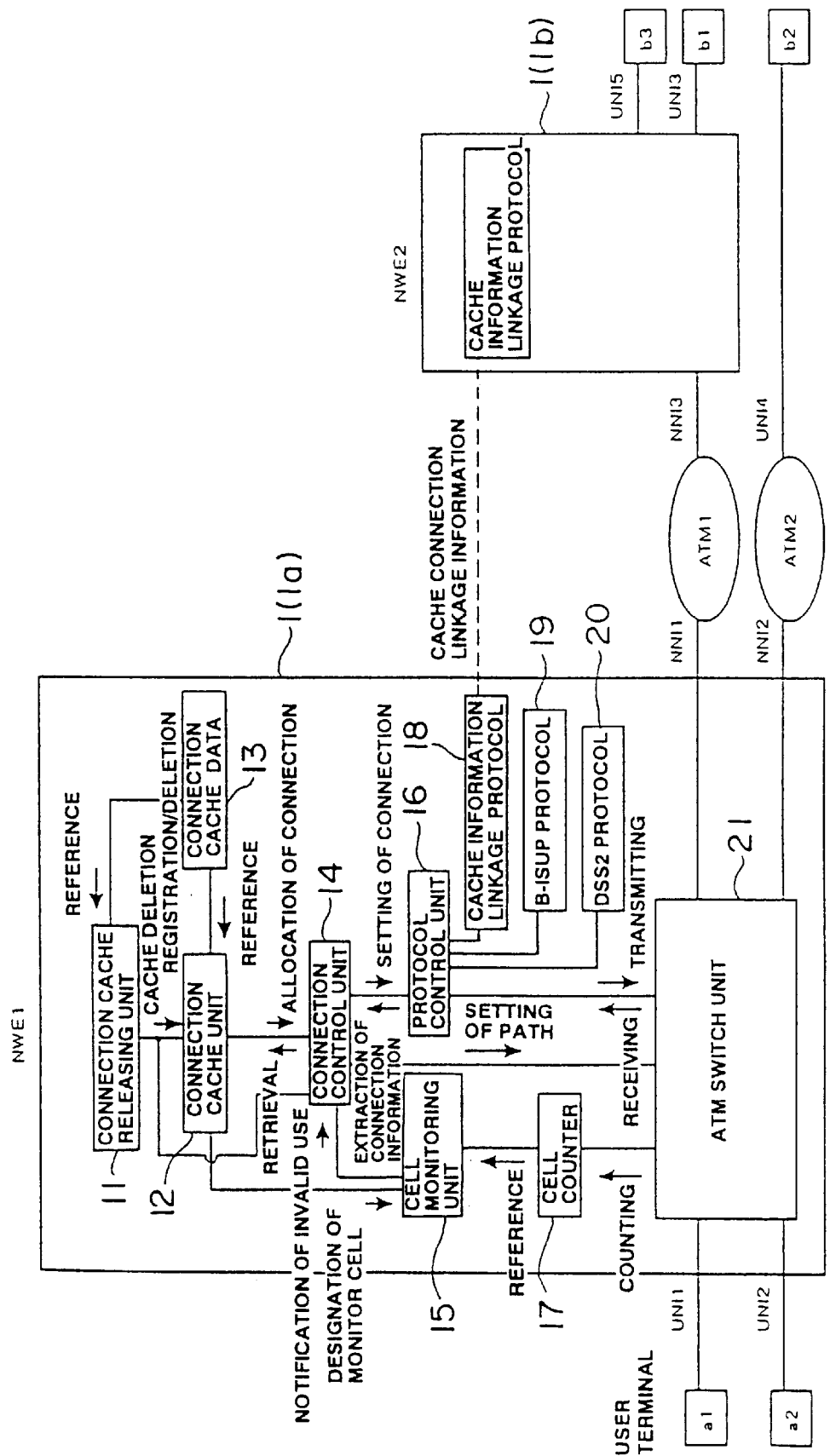
FIG. 2 is a block diagram showing functions actualized by a program in FIG. 1.

FIG. 2 is a block diagram showing respective functions actualized by the central controller 5 executing the respective programs stored in the program storage unit 6, as well as showing an indication command relationship between these respective functions and a data transferring/receiving relationship. These functions may be itemized such as a function of a connection control unit 14 in accordance with the connection control program 6c, a function of the connection cache unit 12 in accordance with the connection cache program 6b, a function of a connection cache releasing unit 11 in accordance with the connection cache release program 6a, and a function of a cell monitoring unit 15 in accordance with the cell monitoring program 6d. The connection cache releasing unit 11, the connection cache unit 12, the connection control unit 14 and the cell releasing unit 15, correspond to a connection management unit.

The connection control unit 14 manages the connection within the ATM switch unit 21, as a PVC based on the PVC information 7a and also as an SVC based on a connection setting request message given from the terminal. More specifically, the connection control unit 14, per connection, imparts a VC identifier used for the connection concerned to the ATM cell belonging to the call allocated with this connection, and sets within the ATM switch unit 21 a path for routing to an interface corresponding to the above VC identifier. Note that the connection control unit 14 requests the connection cache unit 12 to allocate the connection when receiving a call control signaling message making the request for setting of connection (which is hereinafter be referred to as a "connection setting request message") from the protocol control unit 16, and requests the connection cache unit 12 to halt the connection when receiving a call control signaling message making a request for a connection release (which is hereinafter called a "connection releasing request message")

The connection control unit 14, if the connection should be connected over between a plurality of ATM network devices, transfers and receives a variety of call control signaling messages such as a request for setting the connection to and from a counter-station ATM network device through the protocol control unit 16.

The connection cache unit 12 manages the setting, the releasing, the halt and activation of the connection information. To be more specific, when the control unit 14 makes a request for allocating the connection, the connection cache unit 12, as far as a connection originating terminal address and a connected terminal. address which are contained in the connection setting request message received by the connection control unit 14 are not registered in the connection cache data 13, generates a new piece of connection information by setting new VC identifiers to the connection originating terminal address, the connected terminal address, a call number and a connection attribute that are contained in the connection setting request message. The connection cache unit 12 then registers the connection cache data 13 with this new piece of connection information, and allocates the connection indicated by this new connection information to the call of which the setting of connected is requested.

The connection cache unit 12, when connection control unit 14 makes a request for halting the connection, sets in a halt state a connection information segment including the call number contained in the connection release request message received by the connection control unit 14 among pieces of the connection information registered in the connection cache data 13 while the above connection information remains registered.

The connection cache unit 12, if the connection information kept in a halt state that corresponds to the connection attribute contained in the call setting request message is registered in the connection cache data 13 when the connection control unit 14 makes the request for allocating the connection, overwrites the connection originating terminal address, the connected terminal address and the call number which are contained in the connection setting request message received by the connection control unit 14 onto the registered connection information, and puts the connection information into an activated state, thereby allocating the existing connection to the call of which the setting of connection is requested.

It is to be noted that in the following discussion the registration of the corresponding connection information into the connection cache data 13 is expressed such as "caching the connection", and the connection in which the corresponding connection information is registered in the connection cache data 13 is termed as "cache connection".

Figure 3:
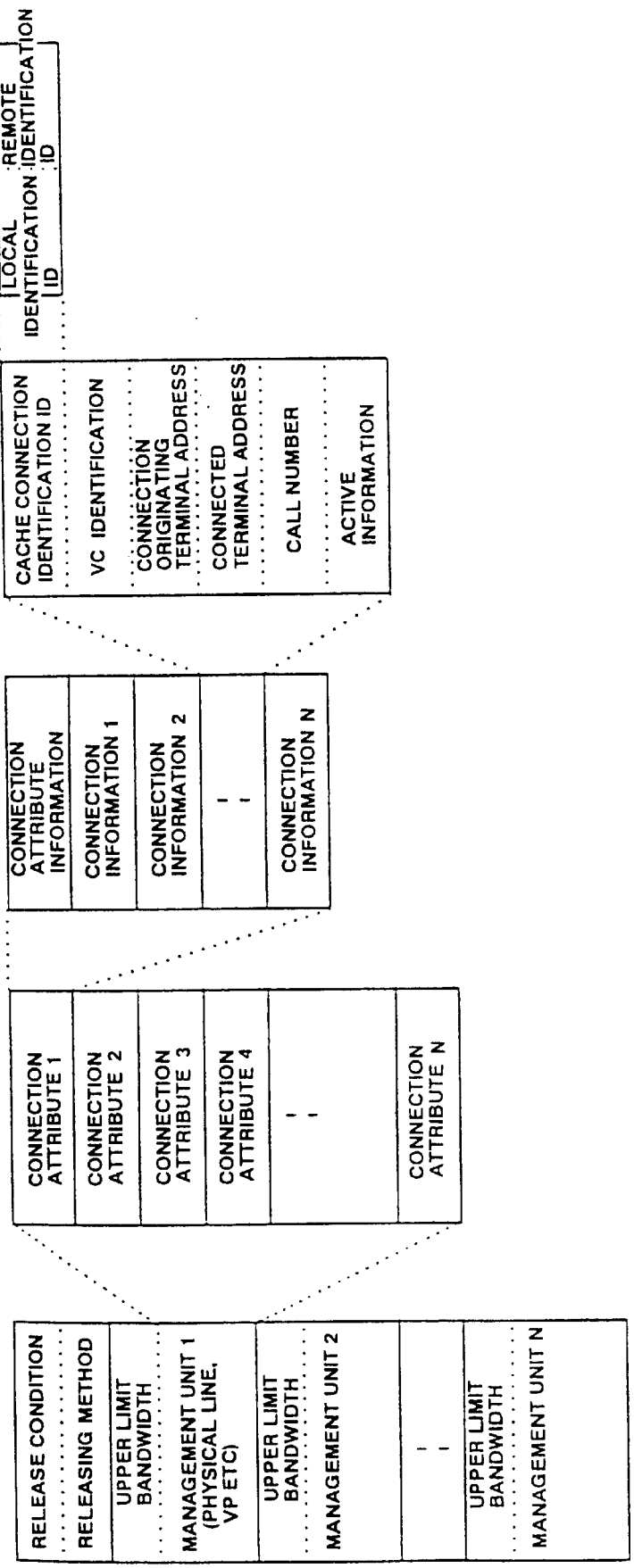
FIG. 3 is a diagram showing a data structure of connection cache data in FIG. 2.

FIG. 3 is a diagram showing a data structure of the connection cache data 13 serving as a connection information retaining part. As apparent from FIG. 3, the connection cache data 13 roughly sectionalized in a release condition parameter, a releasing method parameter and a plurality of management unit blocks. These management unit blocks are prepared for every VP (Virtual Path). In the example of FIG. 3, blocks are prepared for every physical line of each of the NNI1 and NNI2, or for every VP set in each NNI).

Each management unit block further comprises an upper limit bandwidth parameter for indicating an upper limit of a total sum of bandwidths (i.e., a total sum of bandwidths corresponding to the number of pieces of registrable connection information) cashable with respect to the connections belonging to that management unit and a multiplicity of connection attribute areas. Herein, the connection attribute is a combination of a class of QOS (which is a range of assuring a quality of service), an ATM transfer capability (a distinction between a requested bandwidth assurance type, and a best-effort type etc.) and a size of the bandwidth to be used.

Each connection attribute area is constructed of a connection attribute parameter for indicating the above connection attribute and a multiplicity of connection information for connections bearing the connection attributes.

Each piece of connection information comprises cache connection identifications ID (an identification ID <local identification ID> of the concerned connection in the self-ATM network device, and an identification ID <remote identification ID> of the concerned connection in the counter-station ATM network device), a VC identifier, an address of the connection originating user terminal (a connection originating terminal address), an address of the connected user terminal (a connected terminal address), a call number and activation information. The activation information is herein a flag for indicating whether the connection indicated by the connection information is in a halt state or an activated state.

Note that the above-mentioned release condition parameter shows a release condition for releasing the connection information registered in the cache connection data 13. The release conditions are such that the set bandwidth of the cache connection be over 60% of the management bandwidth, a total number of the cache connections be "n" or larger, a set time has elapsed, a rejection call occurs, and so on.

The releasing method parameter described above indicates a connection releasing method in the case the release condition indicated by the release condition parameter be met. This releasing method might be exemplified such as fetching n-pieces of connection information from the respective connection attribute areas and releasing the connection indicated by the fetched connection information, releasing an n-number of connections in sequence from the one exhibiting the oldest hysteresis among all the connections, and releasing the n-number of connections in sequence from the one exhibiting the minimum using frequence among all the connections.

Referring back to FIG. 2, the connection cache releasing unit 11 refers to the release condition parameter and the releasing method parameter in the connection cache data 13, and, if the release condition shown by the release condition parameter is satisfied, specifies a release target connection in accordance with the releasing method indicated by the releasing method parameter. Then, the connection cache releasing unit 11 indicates the connection control unit 14 to release a path as well as indicating the connection cache unit 12 to delete the connection information corresponding to that release target connection.

The cell monitoring unit 15 checks, per VC identifier contained in the connection information which has been set in the halt state by the connection cache unit 12, whether or not the ATM cell having this VC identifier invalidly flows into the ATM switch unit 21 on the basis of a counted result which the cell counter 17 notified. Then, with respect to the connection in which the ATM cell invalidly flows, the cell monitoring unit 15 indicates the connection control unit 14 to release the path.

(Flow of Control in Each Unit)

Given next is an explanation of a processing flow in the individual unit such as the protocol control unit 16, the connection control unit 14, the connection cache unit 12, the connection cache releasing unit 11 and the cell monitoring unit 15 which have been explained so far.

<Protocol Control Unit>

Figure 4:
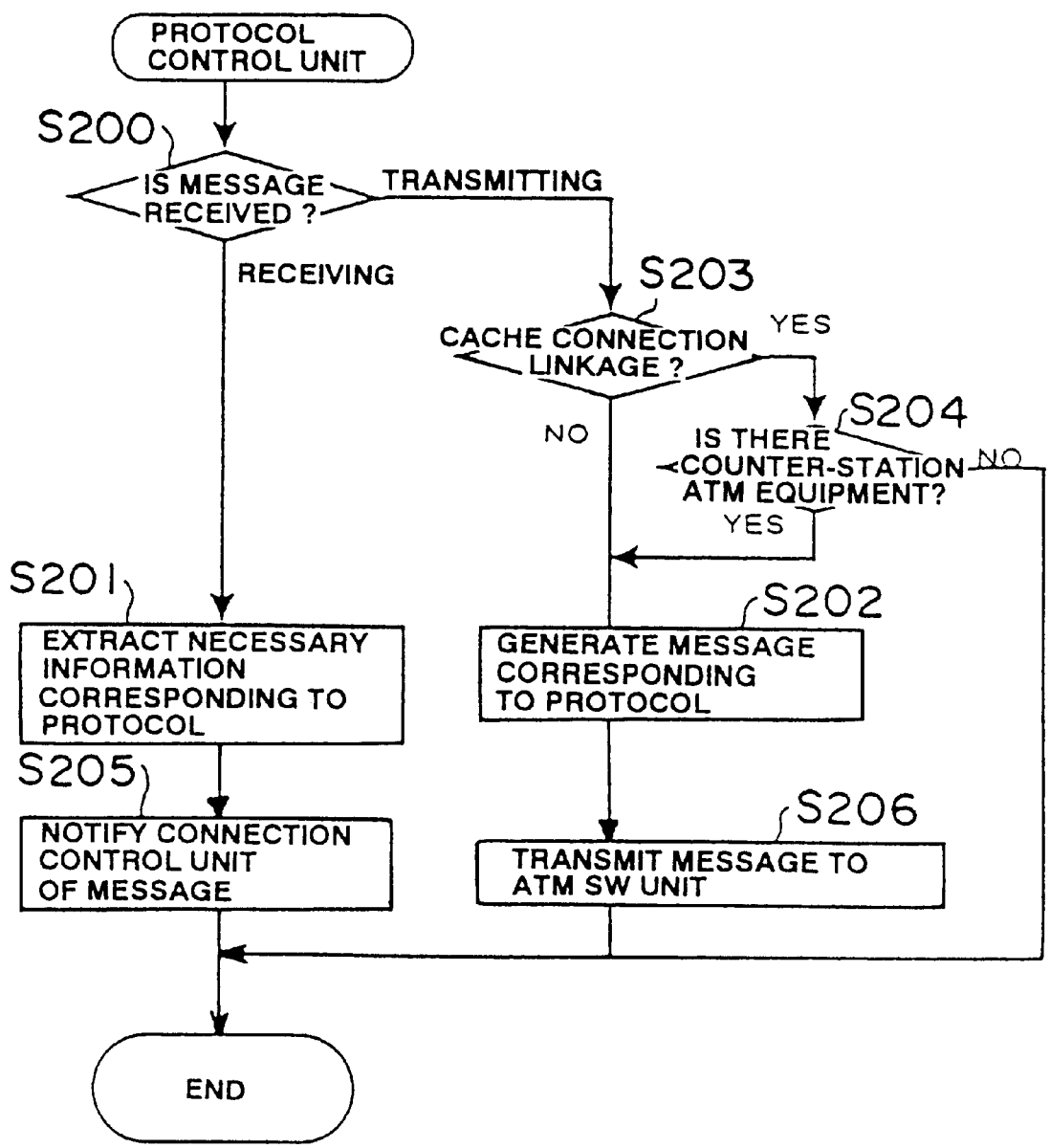
FIG. 4 is a flowchart showing a content of processing by a protocl control unit in FIG. 2.

FIG. 4 is a flowchart showing a processing flow in the protocol control unit 16. This flow chart starts when the protocol control unit 16 receives from the ATM switch unit 21 the call control signaling messages (a connection is setting request message from a terminal or other ATM network device, a cache connection registration request message from the counter-station ATM network device, a connection release request message from a terminal or other ATM network device, a cache connection stop request message from the counter-station ATM network device, a cache connection activation request message from the counter-station ATM network device, and a cache connection deletion request message from the counter-station ATM network device), and when receiving from the connection control unit 14 message transmission requests (transmission request for a connection setting request message <S305> to the connected interface, transmission request for a cache connection registration request message <S306> to the counter-station ATM network device, transmission request for a connection setting completion notifying message <S308> to a requesting interface, transmission request for a cache connection activation request message <S309> to the counter-station ATM network device, transmission request for a connection release completion notifying message <S311> to the requesting interface, transmission request for a cache connection stop request message <S312> to the counter-station ATM network device, transmission request for a cache connection activation completion notifying message <S314> to the counter-station ATM network device, transmission request for a cache connection stop completion notifying message <S314> to the counter-station ATM network device, a cache connection registration completion notifying message transmission request <S314> to the counter-station ATM network device, transmission request for a connection release request message <S318> to the connected interface, transmission request for a cache connection delete request message <S319> to the counter-station ATM network device, and transmission request for a cache connection delete completion notifying message <S321> to the counter-station ATM network device).

In first step S200 after the start, the protocol control unit 16 checks whether the call control signaling message has been received from the ATM switch unit 21 or the message transmission request to the ATM switch unit 21 has been received. Then, if the call control signaling message has been received from the ATM switch unit 21, the protocol control unit 16 formalizes the same call control signaling message by extracting the necessary information out of the call control signaling message in accordance with the protocol used in the call control signaling message in S201.

In next step S205, the protocol control unit 16 notifies the connection control unit 14 of the call control signaling message formalized in S204. After a completion of the process in S205, the processing by the protocol control unit 16 comes to an end.

On the other hand, the protocol control unit 16, when judging in S200 that the message transmission request to the ATM switch unit 21 has been received, checks in S203 whether or not the message transmission request is a request for transmitting the cache connection linkage information (the cache connection registration request message, the cache connection activation request message, the cache connection stop request message, a cache connection stop completion notifying message, a cache connection registration completion notifying message, a cache connection delete request message, and a cache connection delete completion notifying message). Then, if the message transmission request is not the request for transmitting the cache connection linkage information, the protocol control unit 16 advances the processing to S202. Whereas if the message transmission request is the request for transmitting the cache connection linkage information, the protocol control unit 16 advances the processing to S204.

In S204, the protocol control unit 16 checks whether or not the counter-station ATM network device incorporating a connection cache function (i.e., the function of the connection cache unit 12) exists somewhere up to the connected terminal. Then, if there are no counter-station ATM network devices, or if the counter-station ATM network devices exist but do not incorporate the connection cache function, the processing by the protocol control unit 16 is finished. By contrast, if there is the counter-station ATM network device incorporating the connection cache function, the protocol control unit 16 makes the processing proceed to S202.

In S202, the protocol control unit 16 generates a message text in accordance with the protocol corresponding to a type of the interface led to a transmitting destination of the message requested to be transmitted.

In next step S206, the protocol control unit 16 forwards the message text generated in S202 to the ATM switch unit 21. After completion of the process in S206, the processing by the protocol control unit 16 comes to an end.

<Connection Control Unit>

Figure 5:
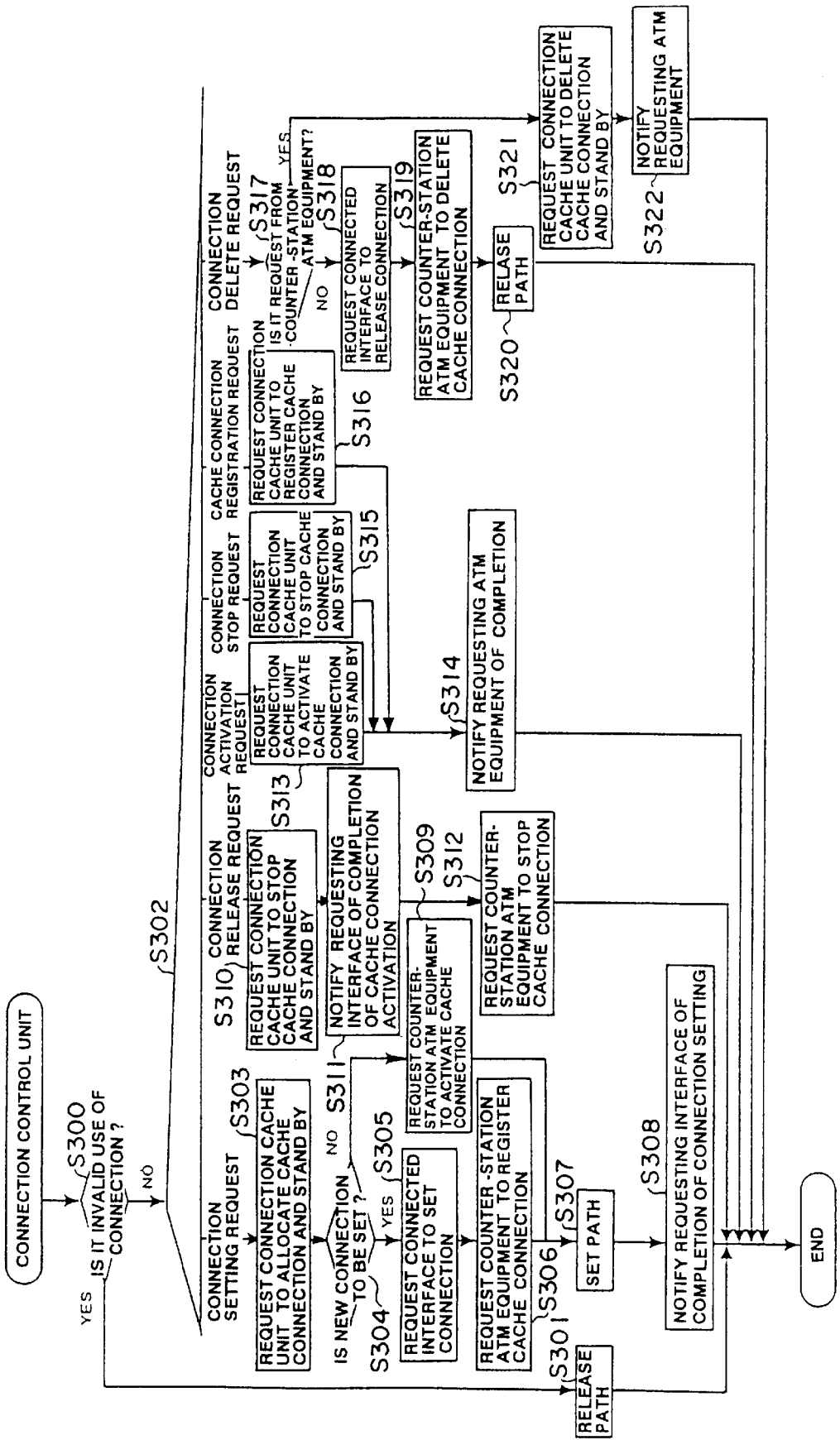
FIG. 5 is a flowchart showing a content of processing by a connection control unit in FIG. 2.

FIG. 5 is a flowchart showing a processing flow in the connection control unit 14. This flowchart starts when the protocol control unit 16 notifies the connection control unit 14 of the call control signaling message (S205), when the connection control unit 14 receives the connection delete request from the connection cache releasing unit 11 (S505), and when notified of an invalid use from the cell monitoring unit 15 (S604).

Then, in first step S300, the connection control unit 14 checks whether or not the notification of the invalid use is received from the cell monitoring unit 15. If notified of the invalid use, the connection control unit 14 releases within the ATM switch unit 21 the path for the ATM cells containing the "VC identifier" indicated in the connection information included in the notification of the invalid use in S301. After a completion of the process in S301, the processing by the connection control unit 14 is ended.

While on the other hand, when judging in S300 that the invalid use is not notified, the connection control unit 14 checks in S302 what sort of call control signaling message or connection delete request is received. Then, in the case of receiving the connection setting request message, the processing proceeds to S303. When receiving the connection release request message, the processing proceeds to S310. When receiving the connection activation request message, processing proceeds to S313. When receiving the connection stop request message, the processing proceeds to S315. When receiving the connection registration request message, the processing proceeds to S316. When receiving the connection delete request message or receiving the connection delete request from the connection-cache releasing unit 11, the processing proceeds to S317.

In S303, the connection control unit 14 requests the connection cache unit 12 to allocate a cache connection. This cache connection allocating request includes the connection originating terminal address, the connected terminal address, the call number and the connection attribute in the connection setting request message. Then, the connection control unit 14, when receiving a notification of completion with respect to this request (which is a notification of completing the allocation of the cache connection in S404, or a notification of the request for the setting of a new connection in. S407) from the connection cache unit 12, advances the processing to S304. Note that when the cache connection is allocated (S403), the notification contains the connection information on this cache connection, and when the new connection information is registered (S406), the notification contains a content of this piece of connection information.

In S304, the connection control unit 14 checks whether the completion notification received from the connection cache unit 12 is the new connection setting request notification or not. Then, in the case of the new connection setting request notification, the connection control unit 14 requests in S305 the protocol control unit 16 to transmit the connection setting request message to the connected interface.

In next step S306, the connection control unit 14 requests the protocol control unit 16 to transmit a cache connection registration request message to the counterstation ATM network device. At this time, the connection control unit 14 stores the cache connection registration request message with a "local identification ID" and the "connection originating terminal address" which are contained in the new connection setting request notification given from the connection cache unit 12, and requests the protocol control unit 16 to transmit it. After a completion of the process in S306, the connection control unit 14 advances the processing to S307.

By contrast, when judging in S304 that the completion notification received from the connection cache unit 12 is the cache connection allocation completion notification, the connection control unit 14 requests in S309 the protocol control unit 16 to transmit the cache connection activation request message to the counter-station ATM network device. At this time, the connection control unit 14 stores the cache connection activation request message with a "remote identification ID" contained in the connection allocation completion notification given from the connection cache unit 12, and requests the protocol control unit 16 to transmit it. After a completion of the process in S309, the connection control unit 14 advances the processing to S307.

In S307, on the basis of the connection information contained in the completion notification given from the connection cache unit 12, the connection control unit 14 sets within the ATM switch unit 21 a path for routing the ATM cell containing the "VC identifier" indicating in this piece of connection information to the interface corresponding to the same VC identifier.

In next step S308, the connection control unit 14 requests the protocol control unit 16 to transmit the connection setting completion notifying message to a request originating interface. It is to be noted that this connection setting completion notifying message contains the VC identifier in the completion notification given from the connection cache unit 12. After a completion of the process in S308, the processing by the connection control unit 14 is ended.

On the other hand, in S310, the connection control unit 14 requests of the connection cache unit 12 to stop the cache connection. This cache connection stop request includes the connection originating terminal address, the connected terminal address, the call number and the connection attribute in the cache connection releasing request message. Then, the connection control unit 14, when receiving a completion notification (a cache connection stop completion notification in S415) with respect to the above request from the connection cache unit 12, advances the processing to S311. Note that this completion notification contains a content of the connection information on the cache connection halted.

In S311, the connection control unit 14 requests the protocol control unit 16 to transmit the connection release completion notifying message to the request originating interface.

In next step S312, the connection control unit 14 requests the protocol control unit 16 to transmit the cache connection stop request message to the counterstation ATM network device. At this time, the connection control unit 14 stores the cache connection stop request message with a "remote identification ID" contained in the cache connection stop completion notification given from the connection cache unit 12, and requests the protocol control unit 16 to transmit it. After a completion of the process in S312, the processing by the connection control unit 14 comes to an end.

On the other hand, in S313, the connection control unit 14 requests the connection cache unit 12 to activate the cache connection. This cache connection activating request includes a "remote identification ID (a local identification ID)" for specifying a target connection. Then, the connection control unit 14, when receiving a completion notification (a cache connection activation completion notification in S417) with respect to the above request from the connection cache unit 12, advances the processing to S314.

In S314, the connection control unit 14 requests the protocol control unit 16 to transmit a cache connection activation completion notifying message to the counterstation ATM network device. After a completion of the process in S314, the processing by the connection control unit 14 is ended.

On the other hand, in S315, the connection control unit 14 requests the connection cache unit 12 to stop the cache connection. This cache connection stop request contains a "remote identification ID (a local identification ID)" for specifying a target connection. Then, the connection control unit 14, when receiving a completion notification (a cache connection stop completion notification in S415) with respect to the above request from the connection cache unit 12, advances the processing to S314.

In S314, the connection control unit 14 requests the protocol control unit 16 to transmit a cache connection stop completion notifying message to the counter-station ATM network device. After a completion of the process in S314, the processing by the connection control unit 14 is ended.

On the other hand, in S316, the connection control unit 14 requests the connection cache unit 12 to register the cache connection. This request contains the connection information on a registration target cache connection. Then, the connection control unit 14, when receiving a completion notification (a cache connection registering completion notification in S419) with respect to the above request from the connection cache unit 12, advances the processing to S314.

In S314, the connection control unit 14 requests the protocol control unit 16 to transmit the cache connection stop completion notifying message to the counter-station ATM network device. After the completion of the process in S314, the processing by the connection control unit 14 is ended.

On the other hand, in S317, the connection control unit 14 checks whether the connection delete request message from the counter-station ATM network device has been received or the connection delete request from the connection cache releasing unit 11 has been received. Then, in the case of having received the connection delete request message from the counter-station ATM network device, the connection control unit 14 requests in S321 the connection cache unit 12 to delete the cache connection. This cache connection delete request contains a "remote identification ID (a local identification ID)" for specifying a target connection. Then, the connection control unit 14, when receiving a completion notification (a cache connection delete completion notification in S420) with respect to this request from the connection cache unit 12, makes the processing proceed to S322.

In S322, the connection control unit 14 requests the protocol control unit 16 to transmit the cache connection stop completion notifying message to the counter-station ATM network device. After a completion of the process in S322, the processing by the connection control unit 14 is finished.

In contrast with this, when receiving the connection delete request from the connection cache releasing unit 11, the connection control unit 14 requests in S318 the protocol control unit 16 to transmit a connection release request message to the connected interface.

In next step S319, the connection control unit 14 requests the protocol control unit 16 to transmit the cache connection delete request message to the counter-station ATM network device. At this time, the connection control unit 14 stores the cache connection delete request message with a "remote identification ID" contained in the connection delete request given from the connection cache releasing unit 11, and requests the protocol control unit 16 to transmit it.

In next step S320, the path for the ATM cell containing the "VC identifier" indicated in the connection information in the connection delete request is released within the ATM switch unit 21. After a completion of the process in S320, the processing by the connection control unit 14 is finished.

<Connection Cache Unit>

Figure 6:
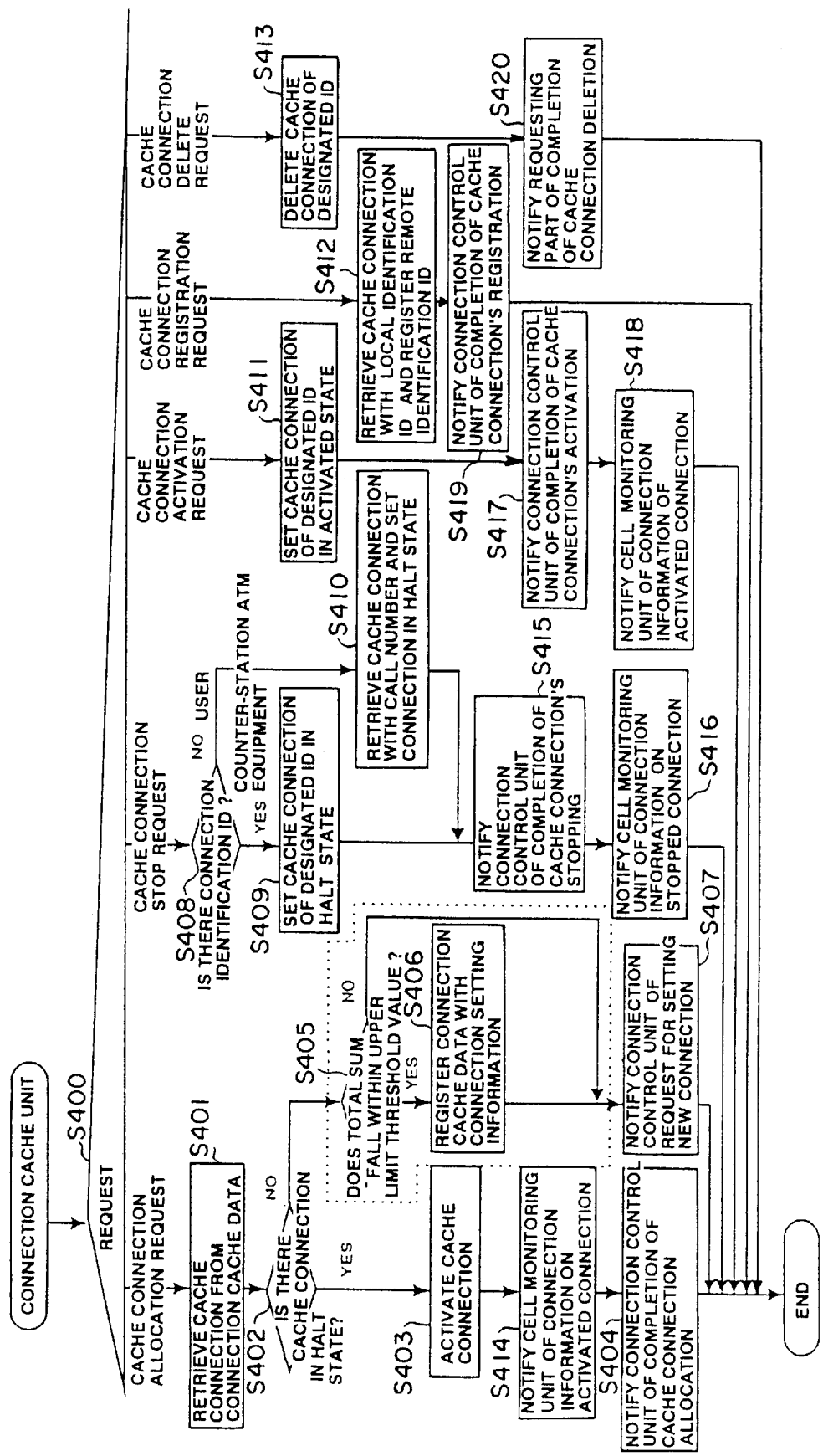
FIG. 6 Us a flowchart showing a content of processing by a connection cache unit in FIG. 2.

FIG. 6 is a flowchart showing a processing flow in the connection cache unit 12. This flowchart starts when the connection cache unit 12 receives requests (a request to allocate the cache connection <S303>, a request to stop the cache connection <S310>, a request to activate the cache connection <S313>, a request to stop the cache connection <S315>, a request to register the cache connection <S316> or a request to delete the cache connection <S321>, and when the connection cache unit 12 receives a connection deleting request <S505> from the connection cache releasing unit 11.

Then, in first step S400, the connection cache unit 12 judges which request has been received. Subsequently, when receiving the request to allocate the cache connection, the processing proceeds to S401. When receiving the request to stop the cache connection, the processing proceeds to S408. When receiving the request to activate the cache connection, the processing proceeds to S411. When receiving the request to register the cache connection, the processing proceeds to S412. When receiving the request to delete the cache connection, the processing proceeds to S413.

In S401, the connection cache unit 12 retrieves a corresponding connection attribute area (concerning the connection attribute of the connection requested for allocation) in a corresponding management unit block (with respect to the physical line and the VP etc of the connection requested for allocation) in the cache connection data 13, and thus searches for the connection information in which "active information" is set in a halt state.

In next step S402, the connection cache unit 12 checks based on a result of retrieval in S401 whether or not the cache connection in the halt state is registered. Then, if the cache connection in the halt state is registered, the connection cache unit 12 specifies in S403 one piece of connection information in which the "active information" is set in the halt state, and sets in an activated state the "active information" of the specified connection information as well as overwriting values in the connection allocation requests onto a "call number" field and a "connected terminal address" field of the specified connection information.

In next step S414, the connection cache unit 12 notifies the cell monitoring unit 15 of the connection information (the VC identifier) in which the "active information" thereof is set in the activated state in S402.

In next step S404, the connection cache unit 12 notifies the connection control unit 14 of a completion of allocation of the cache connection. This allocation completion notification contains a content of the connection information in which the "active information" thereof is set in the activated state in S403. After a completion of the process in S404, the processing by the connection cache unit 12 is finished.

By contrast, when judging in S402 that the cache connection in the halt state is not registered, the connection cache unit 12 advances the processing to S405. In S405, the connection cache unit 12 reads the management unit block retrieved in S401, and judges whether a total sum of bandwidths of all the connections corresponding to the management unit which is obtained per connection attribute area by multiplying a value of the bandwidth shown in the connection attribute information by the number of all pieces of connection information and thus calculating a total sum of products with respect to all the connection attribute areas falls within an upper threshold value indicated by an upper limit bandwidth parameter. Then, if the total sum of bandwidths exceeds the upper limit threshold value, the connection cache unit 12 advances the processing to S407.

Whereas if the total sum of bandwidths falls within the upper limit threshold value, the connection cache unit 12 advances the processing to S406. In S406, the connection cache unit 12 creates a new piece of connection information with respect to the connection requested for allocation and registers the connection information in the connection attribute area retrieved in S401. More specifically, the connection cache unit 12 creates the connection information including the connection originating terminal address, the connected terminal address and the call number which are contained in the connection allocation request received from the connection control unit 14. Subsequently, the connection cache unit 12 generates a unique identification ID, and writes this identification ID to the "local identification ID" field of the newly created connection information. Further, the connection cache unit 12 writes the VC identifier that should be added to the ATM cell transmitted through this connection, to the "VC identification" field of the newly created connection information. Moreover, the connection cache unit 12 sets the activated state in the "active information" field of the newly created connection information. After a completion of the process in S406, the connection cache unit 12 advances the processing to S407.

In S407, the connection cache unit 12 notifies the connection control unit 14 of a request for setting a new connection. This setting request notification contains a content of the connection information of which "active information" is set in the activated state when the process in S406 is executed. After a completion of the process in S407, the processing by the connection cache unit 12 is ended.

On the other hand, in S408, the connection cache unit 12 checks whether or not the connection identification ID is contained in the cache connection stop request given from the connection control unit 14. Then, if the connection identification ID is contained therein, the connection cache unit 12 judges that this cache connection stop request is made based on the cache connection stop request message given from the counter-station ATM network device in S315, and therefore advances the processing to S409.

In S409, the connection cache unit 12 sets the halt state in the "active information" field of the connection information having a "local identification ID" of which value is the same as the "remote identification ID" contained in the cache connection stop request. After a completion of the process in S409, the connection cache unit 12 advances the processing to S415.

Whereas if it is judged in S408 that the cache connection ID is not contained in the cache connection stop request, the connection cache unit 12 judges that this cache connection stop request is made based on the connection release request message given from the terminal in S310, and therefore advances the processing to S410.

In S410, the connection cache unit 12 retrieves the connection cache data 13 on the basis of the connection originating terminal address, the connected terminal address, the call number and the connection attribute information which are contained in the cache connection stop request, and sets the halt state in the "active information" in the relevant connection information. After completion of the process in S410, the connection cache unit 12 advances the processing to S415.

In S415, the connection cache unit 12 notifies the connection control unit 14 of the completion of stopping the cache connection. This cache connection stop completion notification contains a content of the connection information of which "active information" is set to the halt state in S409 or S410.

In next step S416, the connection cache unit 12 notifies the cell monitoring unit 15 of the connection information (the VC identifier) of which "active information" is set to the halt state in S409 or S410. After a completion of the process in S416, the processing by the connection cache unit 12 is ended.

On the other hand, in S411, the connection cache unit 12 sets the activated state in the "active information" field of the connection information having a "local identification ID" of which value is the same as the "remote identification ID" contained in the cache connection activation request given from the connection control unit 14.

In next step S417, the connection cache unit 12 notifies the connection control unit 14 of the completion of activation of the cache connection. This cache connection activating completion notification contains a content of the connection information of which "active information" is set to the activated state in S411.

In next step S418, the connection cache unit 12 notifies the cell monitoring unit 15 of the connection information (the VC identifier) of which "active information" is set to the activated state in S411. After a completion of the process in S418, the processing by the connection cache unit 12 is ended.

On the other hand, in S412, the connection cache unit 12 writes a value of the "local identification ID" contained in the relevant cache connection registration request, to the "remote identification ID" field of the connection information (with a blank field of "remote identification ID") in the connection cache data 13 specified by the connection originating terminal address contained in the cache connection registration request given from the connection control unit 14.

In next S419, the connection cache unit 12 notifies the connection control unit 14 of the completion of registering the cache connection. This cache connection registration completion notification contains a content of the connection information in which the value is written to the "remote identification ID" field in S412. After a completion of the process in S419, the processing by the connection cache unit 12 is finished.

On the other hand, in S413, the connection cache unit 12 deletes from the connection cache data 13 the connection information of which "local identification ID" is coincident with the "remote identification ID" contained in the cache connection delete request given from the connection control unit 14, or is coincident with the connection information contained in the connection delete request given from the connection cache releasing unit 11.

In next step S420, the connection cache unit 12 notifies the part making the request to delete the cache connection, of the completion of registering the cache connection. This cache connection delete completion notification contains a content of the connection information deleted in S413. After a completion of the process in S420, the processing by the connection cache unit 12 is ended.

<Connection Cache Releasing Unit>

Figure 7:
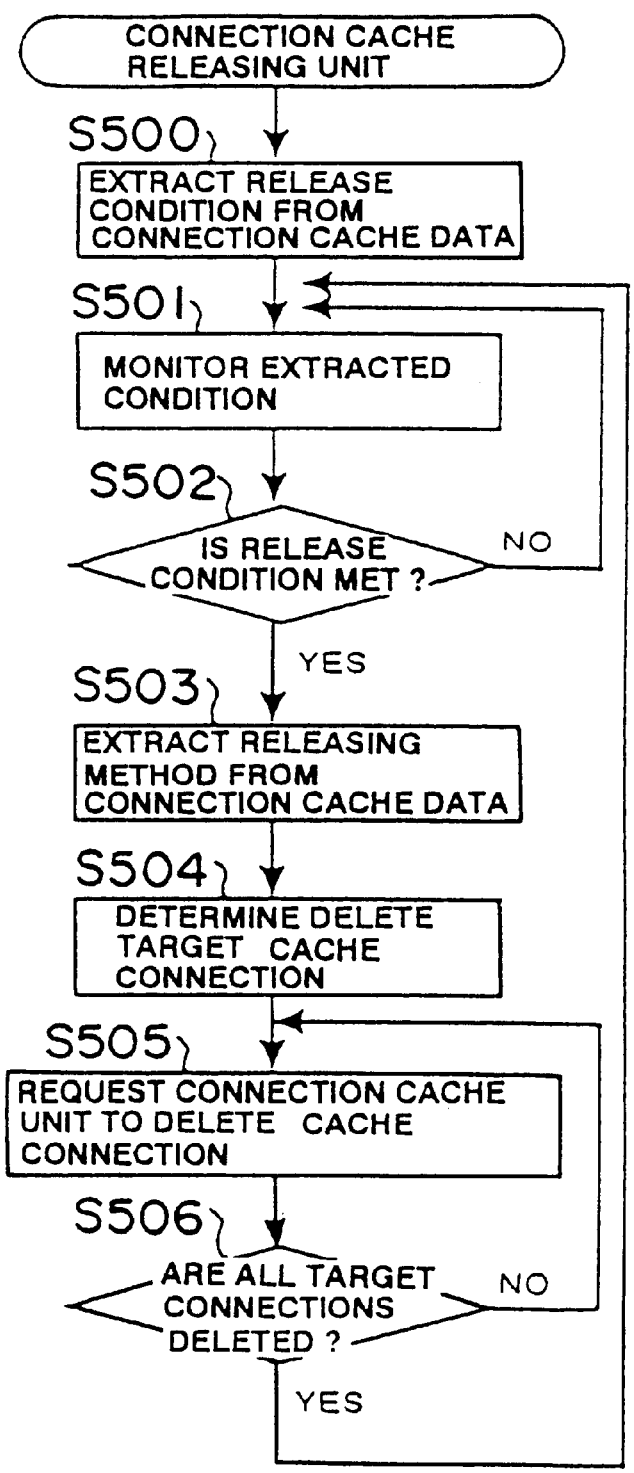
FIG. 7 is a flowchart showing a content of processing by a connection cache releasing unit in FIG. 2.

FIG. 7 is a flowchart showing a processing flow in the connection cache releasing unit 11. This flowchart starts with a trigger that is a switch-ON of the power supply of the call control processor 2. The processing according to the flowchart is executed in parallel to the connection control unit 14 and the connection cache unit 12.

In a first step S500, the connection cache releasing unit 11 reads a "release condition" parameter out of the cache connection data 13.

In next S501, the connection cache releasing unit 11 monitors whether or not each release condition corresponding to the "release condition" parameter read in S500 is satisfied.

In next S502, the connection cache releasing unit 11 checks whether any release condition is met or not. If no release condition is met, the connection cache releasing unit 11 returns the processing to S501. Whereas if any one of the release conditions is met, the connection cache releasing unit 11 advances the processing to S503.

In S503, the connection cache releasing unit 11 reads a "releasing method" parameter out of the cache connection data 13.

In next S504, the connection cache releasing unit 11 specifies a release target cache connection in accordance with the "releasing method" parameter read in S503.

In next step S505, the connection cache releasing unit 11 requests the connection cache unit 12 and also the connection control unit 14 to delete one of the delete target cache connections specified in S504. This cache connection delete request contains the connection information on the delete target cache connections.

In next step S506, the connection cache releasing unit 11 checks whether or not the cache connection delete request in S505 has been made with respect to all the cache connections specified in S504. Then, if the cache connection delete request has not yet been made with respect to all the cache connections specified in S504, the connection cache releasing unit 11 returns the processing to S505. Whereas if the cache connection delete request has been made with respect to all the cache connections specified in S504, the connection cache releasing unit 11 returns the processing to S501.

<Cell Monitoring Unit>

Figure 8:
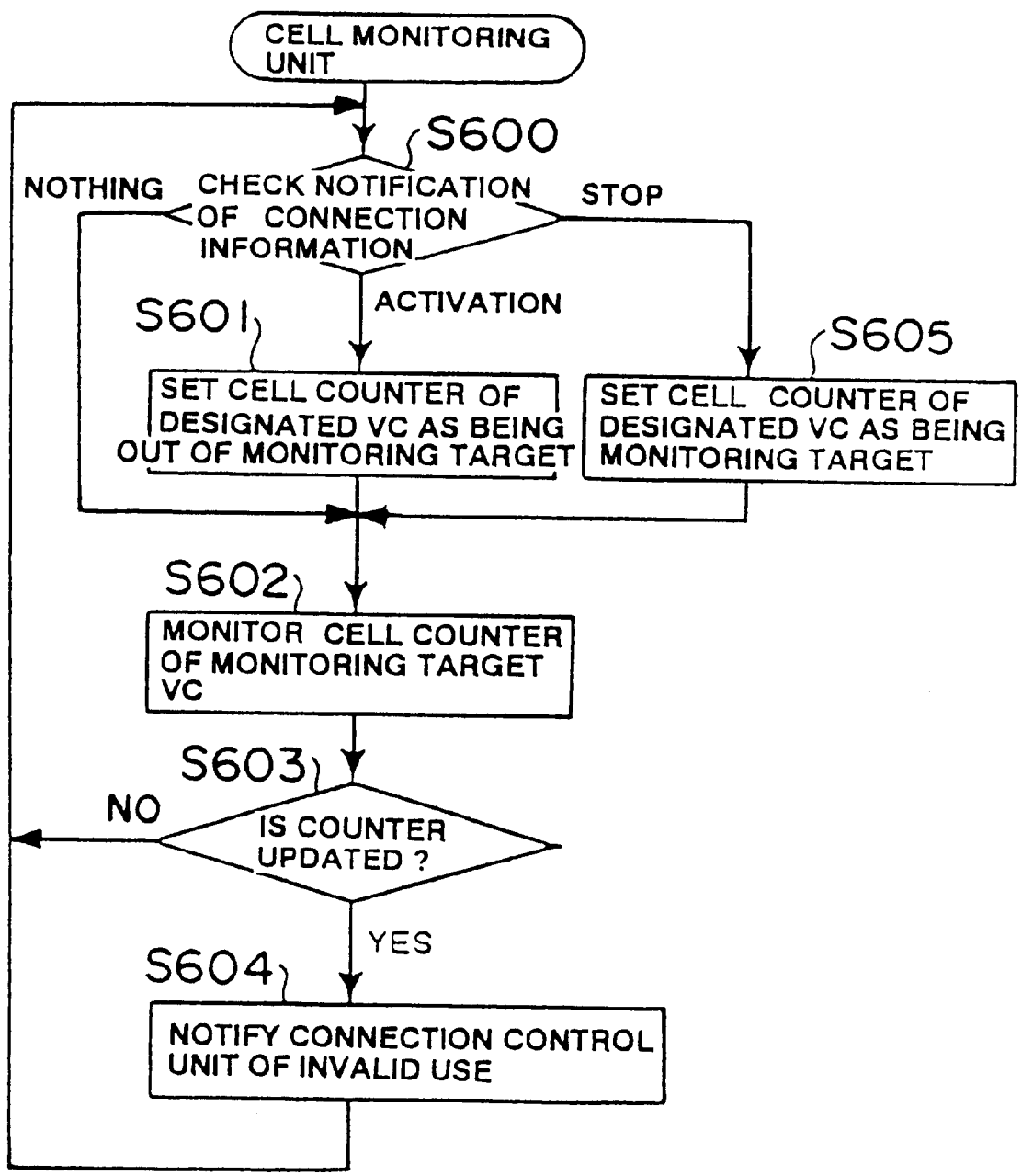
FIG. 8 is a flowchart showing a content of processing by a cell monitoring unit in FIG. 2.
Figure 9:
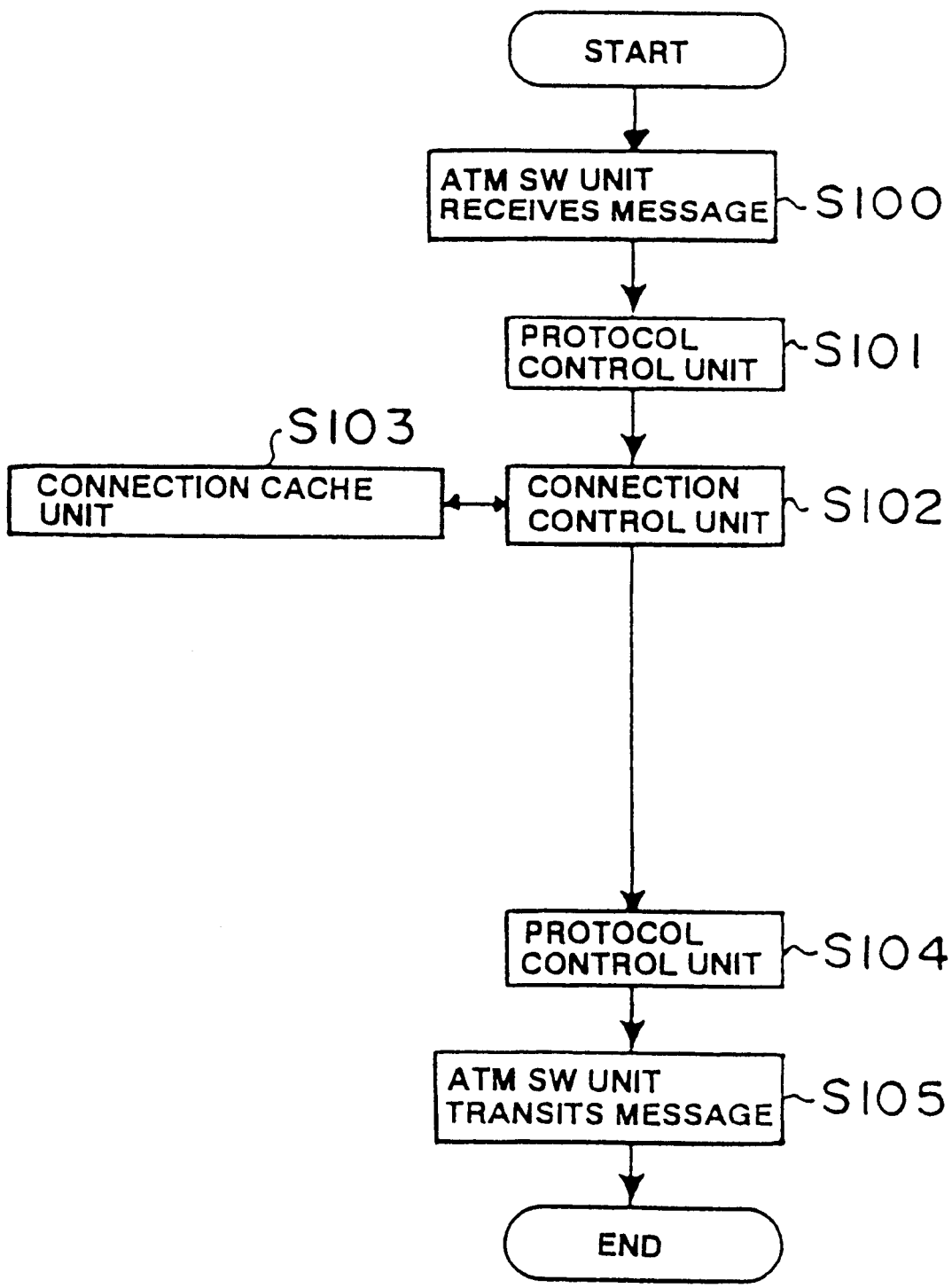
FIG.9 is a flowchart showing a processing flow when receiving a message.

FIG. 8 is a flowchart showing a processing flow in the cell monitoring unit 15. This flowchart starts with a trigger that is a switch-ON of the power supply of the call control processor 2. The processing according to the flowchart is to be executed in parallel to the connection control unit 14 and the connection cache unit 12.

In a first step S600, the cell monitoring unit 15 checks the notification of the connection information from the connection cache unit 12. To be specific, the cell monitoring unit 15 checks whether there is the notification of the connection information, and if notified of the connection information, whether the "active information" field of the notified connection information is set to the activated state or set to the halt state. Then, the cell monitoring unit 15, if not notified of the connection information, advances the processing directly to S602.

Whereas if notified of the connection information in which the activated state is set in the "active information" field, in S601, the cell monitoring unit 15 sets, as being out of the target, a result of counting by the cell counter 17 with respect to the VC identifier contained in the connection information notified. If notified of the connection information in which the halt state is set in the "active information" field, in S605, the cell monitoring unit 15 sets, as being a monitoring target, the result of the counting by the cell counter 17 with respect to the VC identifier contained in the connection information notified. After a completion of the process in S601 or S605, the cell monitoring unit 15 advances the processing to S602.

In S602, the cell monitoring unit 15 monitors the counted result of the cell counter 17 set as being the monitoring target.

In next S603, the cell monitoring unit 15 checks whether or not the monitoring target counted result of the cell counter 17 is updated. Then, if the monitoring target counted result of the cell counter 17 is not updated, the cell monitoring unit 15 returns the processing to S600.

Whereas if the monitoring target counted result of the cell counter 17 is updated, the cell monitoring unit 15 notifies in S604 the connection control unit 14 of an invalid use. This invalid use notification contains the connection information including the VC identifier corresponding to the updated result of counting by the cell counter 17. After a completion of the process in S604, the cell monitoring unit 15 returns the processing to S600.

(Operation of ATM Network Device)

Next, an operation of the thus constructed ATM network device will be explained. It is assumed as an explanatory premise that, as shown in FIG. 2, the ATM network device (NWE2) 1b having absolutely the same construction as the ATM network device(NWE1) 1a be connected to this ATM network device 1a via a first ATM network (ATM1). It is also presumed that an interface of the ATM network device (NWE1) 1a to the first ATM network (ATM1) be designated by NNI1 and an interface of the ATM network device (NWE2) 1b to the first ATM network (ATM1) be designated by NNI3.

Further, the user terminals a1, a2 are connected directly to the ATM network device(NWE1) 1a, and a user terminal b2 is connected thereto via a second ATM network ATM2). It is assumed that an interface of this ATM network device (NWE1) 1a to the user terminal a1 be designated by UNI1, an interface of the ATM network device (NWE1) 1a with the user terminal a2 be designated by UNI2, an interface of the ATM network device(NWE1) 1a to the second ATM network (ATM2) be designated by NNI2, and an interface leading from the second ATM network (ATM2) to the user terminal b2 be denoted by UNI4.

Moreover, it is presumed that the user terminals b1, b3 be connected directly to the ATM network device (NWE2) 1b. It is assumed that an interface of the ATM network device (NWE2) 1b to the user terminal b1 be designated by UNI3, and an interface of the ATM network device (NWE2) 1b to the user terminal b3 be designated by UNI5.

In the following discussion, the explanation is given on the assumption that the user terminal a1 or a2 serves as a connection originating terminal, and the user terminal b1 or b2 or b3 serves as a connected terminal. Therefore, the ATM network device (NWE1) 1a is referred to as a "transmitting-side ATM network device 1a", while the ATM network device (NWE2) 1b is referred to as a "receiving-side ATM network device 1b". When the user terminal a1 or a2 communicates with the user terminal b1 or b3, the transmitting-side ATM network device 1a and the receiving-side ATM network device 1b is a "counter-station" with each other and even if the first ATM network (ATM1) is constructed of a plurality of ATM switches.

<Combinational Use of ATM Network Devices in Embodiment 1>

To begin with, there will be explained a case where the transmitting-side ATM network device (NEW1) 1a and the receiving-side ATM network device (NWE2) 1b in the embodiment 1 are used in combination, and the cache connection is implemented therebetween. To be specific, there will be discussed each of cases where the connection is set (cached), stopped and activated between the user terminal a1 and the user terminal b1.

Setting of Cache Connection

Figure 10:
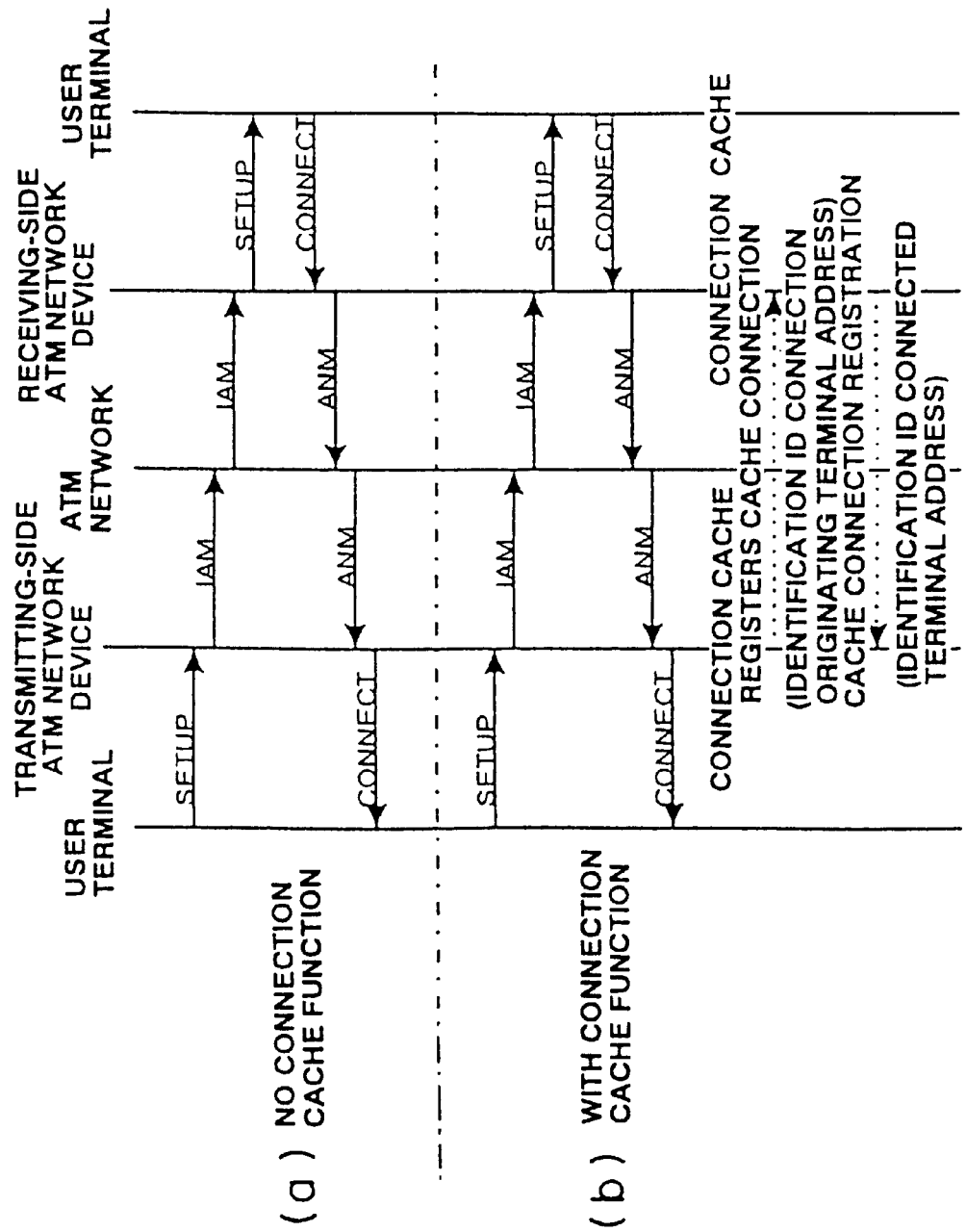
FIG. 10 is a time chart showing a flow of message between the devices when setting a connection.

The case in which the connection is set between the user terminal a1 and the user terminal b1, is described with reference to a time chart of FIG. 10(b).

(1) The protocol control unit 16 in the transmitting-side ATM network device(NWE1) 1a, when receiving the connection setting request message (SETUP) transmitted from the user terminal a1 via the UNI1 and the ATM switch unit 21 (S101), formalizes the connection setting request message (SETUP) by extracting the connection setting information in accordance with a DSS2 protocol 20 (S201). Then, the protocol control unit 16 notifies the connection control unit 14 of the formalized connection setting request message (S205, S102).

In the processes shown in FIG. 5 which are executed in the connection control unit 14, it is not judged that there is made the notification of. the connection invalid use (S300), and, because of the received message being the connection setting request message (S302), the connection control unit 14 requests the connection cache unit 12 to allocate the cache connection (S303, S103).

In the processes shown in FIG. 6 which are executed in the connection cache unit 12, the request is to allocate the cache connection (S400), and therefore the connection cache unit 12 retrieves the connection cache data 13(S401). At this point of time, since no stopped connection information is registered in the connection cache data 13(S402), the connection cache unit 12 judges whether or not the total sum of bandwidths of all the connections with respect to the relevant management unit falls within the upper limit threshold value (S405). It is herein assumed that the total sum of bandwidths falls within the upper limit threshold value. Further, the connection attributes demanded are, it is assumed, that an ATM transfer capability is CBR (Constant Bit Rate), the bandwidth required is 1 M <bps>, and a QOS (Quality-of-Service) class is "2". Accordingly, the connection cache unit 12 sets the local identification ID (=1), the VC identifier (VPI=100, VCI=300), the connection originating terminal address (=a1), the connected terminal address (=b1), the call number (=1), the active information (=activation), in the fields of the connection information 1 corresponding to the connection attribute 2 of the management unit 1 (the management unit 1 is a management unit block with respect to the NNI1, and the management unit 2 is a management unit block with respect to the NNI2) of the connection cache data 13(S406). After registering the connection information, the connection cache unit 12 notifies the connection control unit 14 of a new connection setting request (S407, S102).

In the processes shown in FIG. 5 which are executed in the connection control unit 14, an indication of the connection cache unit 12 in response to the request to allocate the cache connection is the notification of the new connection setting request (S304), and hence the connection control unit 14 requests the protocol control unit 16 to transmit the connection setting request message to the NNI1 (S305). Further, the connection control unit 14 requests the protocol control unit 16 to transmit the cache connection registration request message to the counter-station ATM network device (S306). Moreover, the connection control unit 14 sets within the ATM switch unit 21 the path for the ATM cells coming from the user terminal al (S307), and requests the protocol control unit 16 to transmit the connection setting completion notifying message to the UNI1 (S308, S104).

In the processes shown in FIG. 4 which are executed in the protocol control unit 16, the transmissions of the connection setting request message to the NNI1 and of the connection setting completion notifying message to the UNI1 are implemented without depending on the cache connection linkage information protocol (S203), and hence the protocol control unit 16 generates the connection setting request message (IAM) in accordance with a B-ISUP protocol 19 with respect to the NNI1 (S202) and forwards this message (S206, S105). Then, the protocol control unit 16 generates the connection setting completion notifying message (CONNECT, which contains the notification of the VC identifier used for the connection allocated) in accordance with a DSS2 protocol 20 with respect to the UNI1 (S202) and forwards this message (S206, S105). On the other hand, the cache connection registration request message is transmitted based on the cache connection linkage information protocol, and besides the connected user terminal b1 is connected to the counter-station ATM network device (the receiving-side ATM network device 1b) incorporating the connection cache function (S203). The protocol control unit 16 therefore generates the cache connection registration request message (including the connection originating terminal address <=a1>, and the local identification ID <=1>) according to a cache information linkage protocol 18 (S202), and forwards this message (S206, S105).

(2) The connection setting request message (IAM) sent to the NNI1 from the ATM switch unit 21 in the transmitting-side ATM network device (NWE1) 1a is, transferred toward the receiving-side ATM network device 1b defined as the counter-station ATM network device while making each ATM switch (with its illustration omitted) within the first ATM network (ATM1) set connection (SVC). On the other hand, the cache connection registration request message is transmitted to the receiving-side ATM network device (NWE2) 1b via the PVC set between the transmitting-side ATM network device (NWE1) 1a and the receiving-side ATM network device (NWE2) 1b.

(3) The protocol control unit 16 in the receiving-side ATM network device (NWE2) 1b, when receiving the connection setting request message (IAM) transferred from the first ATM network (ATM1) via the NNI3 and the ATM switch unit 21, formalizes the connection setting request message (IAM) by extracting the connection setting information in accordance with a B-ISUP protocol 19 (S201). Then, the protocol control unit 16 notifies the connection control unit 14 of the formalized connection setting request message (S205, S102).

Thereafter, through the same procedures as those executed in the transmitting-side ATM network device (NWE1) 1a, the connection cache unit 12 sets the local identification ID (=2), the VC identifier (VPI=100, VCI=300), the connection originating terminal address (=a1), the connected terminal address (=b1), the call number (=1), the active information (=activation), in the fields of the connection information 1 corresponding to the connection attribute 2 of the management unit 1 (the management unit 1 is a management unit block with respect to the NNI3) of the connection cache data 13(S406). Further, the protocol control unit 16 generates the connection setting request message (SETUP) according to a DSS2 protocol 20 with respect to the UNI3 (S202), and forwards this message (S206, S105). The protocol control unit 16 generates a connection setting completion notifying message (ANM) in accordance with the B-ISUP protocol 19 with respect to the NNI3 (S202), and sends this message (S206, S105). Further, the protocol control unit 16 generates a cache connection registration request message (containing the connected terminal address <=b1>, and the local identification ID <=2>) according to the cache information linkage protocol 18 (S202), and forwards this message towards the receiving-side ATM network device (NWE1) 1a (S206, S105).

(4) Subsequently, the protocol control unit 16 of the receiving-side ATM network device (NEW2) 1b, when receiving via the ATM switch unit 21 the cache connection registration request message transmitted via the PVC from the transmitting-side ATM network device (NWE1) 1a, formalizes the cache connection registration request message by extracting the necessary information according to the cache information linkage protocol 18 (S201). Then, the protocol control unit 16 notifies the connection control unit 14 of the formalized cache connection registration request message (S205, S102).

In the processes shown in FIG. 5 which are executed in the connection control unit 14, it is not judged that there is made the notification of the connection invalid use (S300), and, because of the received message being the connection registration request message (S302), the connection control unit 14 requests the connection cache unit 12 to register the cache connection (S316, S103).

In the processes shown in FIG. 6 which are executed in the connection cache unit 12, the request is to register the cache connection (S400), and therefore the connection cache unit 12 retrieves the connection attribute 2 of the management unit 1 of the connection cache data 13 and searches for the connection information 1 in which "a1" is written to the "connection originating terminal address" field on the basis of the connection originating terminal address (=a1) contained in the cache connection registration request message. Then, a value (=1) of the "local identification ID" contained in the cache connection registration request message is written to the "remote identification ID" field of the searched connection information (S412). All the processes of registering the cache connection in the receiving-side ATM network device 1b is thus completed.

(5) The cache connection registration request message forwarded from the ATM switch unit 21 in the receiving-side ATM network device (NWE2) 1b, is transmitted to the transmitting-side ATM network device (NWE1) 1a via the PVC set between the transmitting-side ATM network device (NWE1) 1a and the receiving-side ATM network device (NWE2) 1b.

(6) The protocol control unit 16 in the transmitting-side ATM network device (NWE1) 1a, when receiving via the ATM switch unit 21 the cache connection registration request message transmitted via the PVC from the receiving-side ATM network device (NWE2) 1b, formalizes the cache connection registration request message by extracting the necessary information in accordance with the cache information linkage protocol 18 (S201). Then, the protocol control unit 16 notifies the connection control unit 14 of the formalized cache connection registration request message (S205, S102).

In the processes shown in FIG. 5 which are executed in the connection control unit 14, it is not judged that there is made the notification of the connection invalid use (S300), and, because of the received message being the cache connection registration request message (S302), the connection control unit 14 requests the connection cache unit 12 to register the cache connection (S316, S103).

In the processes shown in FIG. 6 which are executed in the connection cache unit 12, the request is to register the cache connection (S400), and therefore the connection cache unit 12 retrieves the connection attribute 2 of the management unit 1 of the connection cache data 13 and searches for the connection information 1 in which "b1" is written to the "connected terminal address" field on the basis of the connected terminal address (=b1) contained in the cache connection registration request message. Then, a value (=2) of the "local identification ID" contained in the cache connection registration request message is written to the "remote identification ID" field of the searched connection information (S412). All the processes of registering the cache connection in the transmitting-side ATM network device 1a is thus completed.

Stop of Cache Connection

Figure 11:
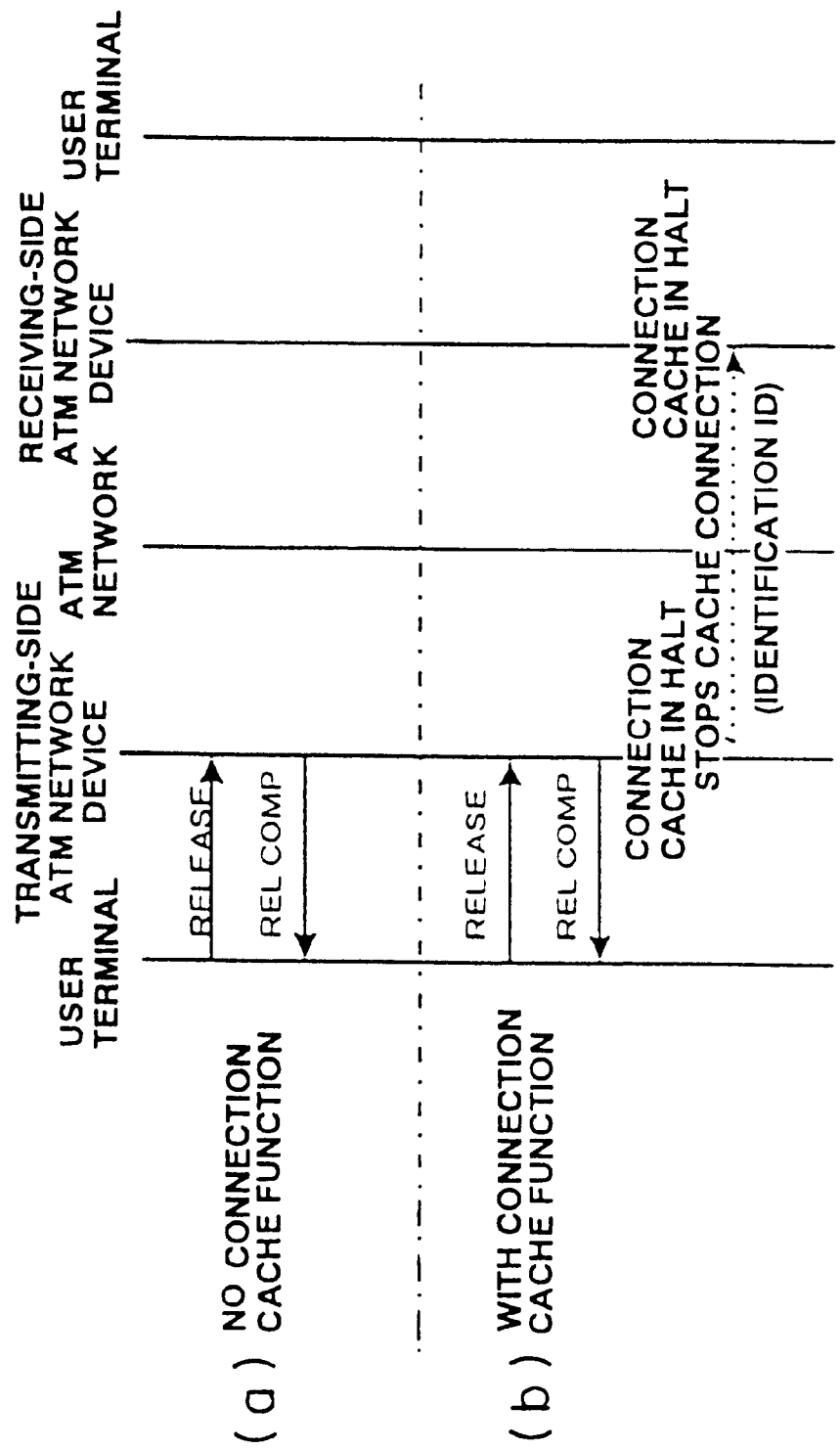
FIG. 11 is a time chart showing a flow of message between the devices when halting the connection.

Given next is an explanation, referring to a time chart in FIG. 11(b), about a case where the user terminal a1 finishes the communications and makes a connection release request under such a state that the cache connection is registered in the manner described above.

(1) The protocol control unit 16 in the transmitting-side ATM network device (NWE1) 1a, when receiving a connection release request message (RELEASE) transmitted from the user terminal a1, analyzes the connection release request message in the manner described above, and notifies the connection control unit 14 of the formalized connection release request message (S100–S102).

In the processes shown in FIG. 5 which are executed in the connection control unit 14, it is not judged that there is made the notification of the connection invalid use (S300), and, because of the received message being the connection release request (S302), the connection control unit 14 requests the connection cache unit 12 to stop the cache connection (S310, S103).

In the processes shown in FIG. 6 which are executed in the connection cache unit 12, the request is to stop the cache connection (S400), and therefore the connection cache unit 12 judges whether or not the cache connection identification ID is contained in the cache connection stop request (S408). In this case, since the cache connection identification ID is not contained in the connection stop request, the connection cache unit 12 indexes the connection cache data 13 based on the call number contained in the connection stop request, and sets the relevant connection in the halt state (S410). Namely, the call number of this connection is "1", and hence the halt state is set in the "active information" field of the connection information 1 corresponding to the call number "1". Further, the connection cache unit 12 notifies the cell monitoring unit 15 of the VC identifier (VPI=100, VCI=300) of the halted connection (S416).

In the processes shown in FIG. 5 which are executed in the connection control unit 14, after having been notified of the cache connection stop completion, the connection control unit 14 requests the protocol control unit 16 to transmit the connection release completion notifying message to the UNI1 (S311) and for transmitting the cache connection stop request message to the counter-station ATM network device (S312).

In the processes shown in FIG. 4 which are executed in the protocol control unit 16, the connection release completion notifying message is transmitted to the UNI1 without depending on the cache connection linkage information protocol (S203), and hence the protocol control unit 16 generates the connection release completion notifying message (REL COMP) in accordance with the DSS2 protocol (S202) and forwards this message (S206, S105). On the other hand, the cache connection stop request message is transmitted based on the cache connection linkage information protocol, and besides the receiving-side user terminal b1 is connected to the counter-station ATM network device (the receiving-side ATM network device 1b) incorporating the connection cache function (S203). The protocol control unit 16 therefore generates the cache connection stop request message (including the connection originating terminal address <=a1>, and the remote identification ID <=2>) according to the cache information linkage protocol 18 (S202), and forwards this message (S206, S105).

(2) The cache connection stop request message forwarded from the ATM switch unit 21 in the transmitting-side ATM network device (NWE1) 1a, is transmitted to the receiving-side ATM network device (NWE2) 1b via the PVC set between the transmitting-side ATM network device (NWE1) 1a and the receiving-side ATM network device (NWE2) 1b.

(3) The protocol control unit 16 in the receiving-side ATM network device (NWE2) 1b, when receiving via the ATM switch unit 21 the cache connection stop request message transmitted via the PVC from the transmitting-side ATM network device (NWE1) 1a, formalizes the cache connection stop request message by extracting the necessary information in accordance with the cache information linkage protocol 18 (S201). Then, the protocol control unit 16 notifies the connection control unit 14 of the formalized cache connection stop request message (S205, S102).

In the processes shown in FIG. 5 which are executed in the connection control unit 14, it is not judged that there is made the notification of the connection invalid use (S300), and, because of the received message being the cache connection stop request message (S302), the connection control unit 14 requests the connection cache unit 12 to stop the cache connection (S315, S103).

In the processes shown in FIG. 6 which are executed in the connection cache unit 12, the request is to stop the cache connection (S400), and therefore the connection cache unit 12 judges whether or not the cache connection identification ID is contained in the cache connection stop request (S408). In this case, since the remote identification ID is contained in the connection stop request, the connection cache unit 12 indexes the connection cache data 13 based on the remote identification ID contained in the connection stop request, and sets in the halt state the connection in which the local identification ID takes the same value as a value of this remote identification ID. Namely, the value of the remote identification ID contained in this connection stop request is "2", and hence the halt state is set in the "active information" field of the connection information 1 in which the "2" is written to the "local identification ID" field. Further, the connection cache unit 12 notifies the cell monitoring unit 15 of the VC identifier (VPI=100, VCI=300) of the stopped connection (S416).

As the result of the above processes having been executed, the connection appears apparently released from the transmitting-side and receiving-side user terminals a1, b1, and nevertheless still remains set between the transmitting-side ATM network device(NWE1) 1*a* and the receiving-side ATM network device(NWE2) 1*b*.

Activation of Cache Connection

Figure 12:
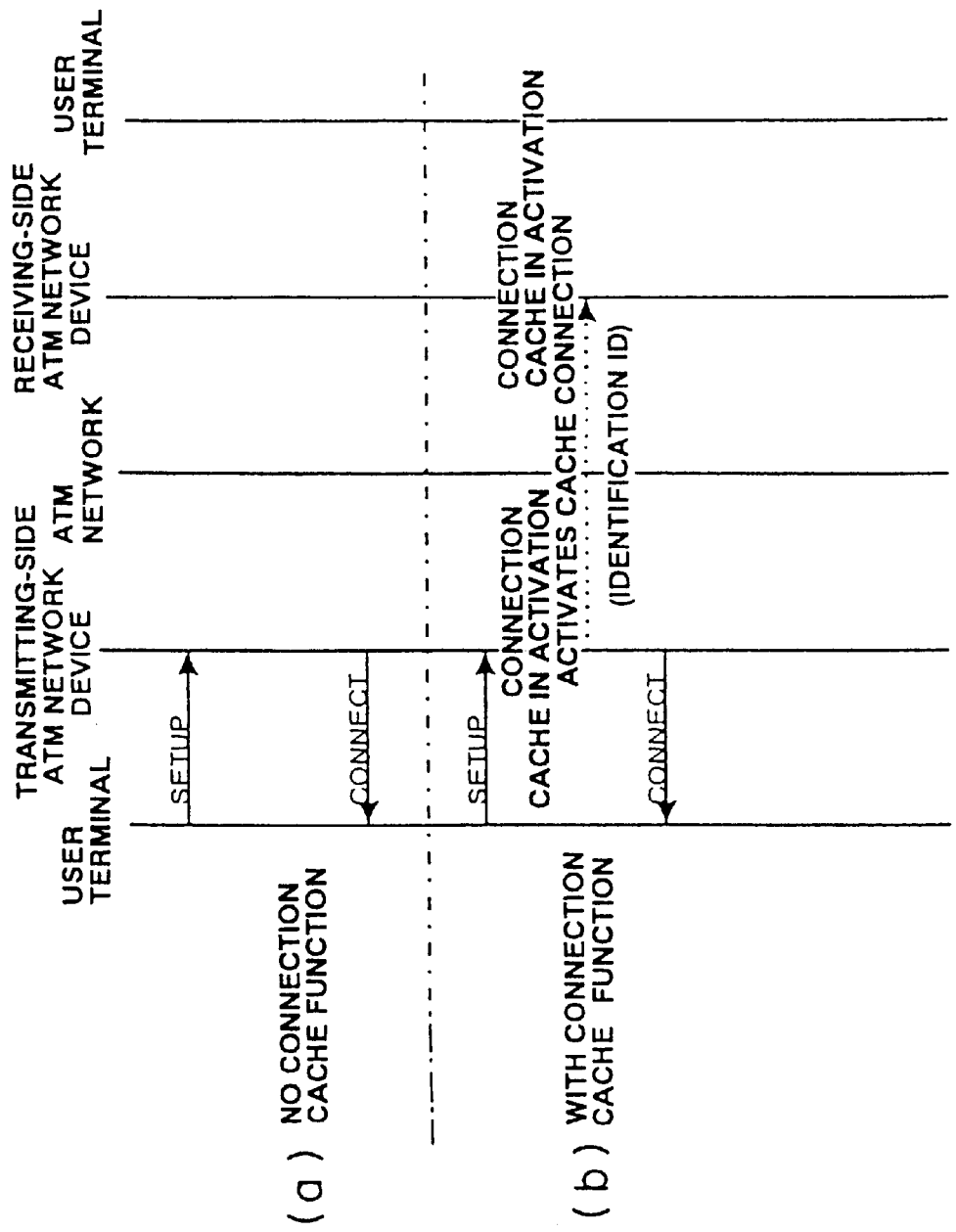
FIG. 12 is a time chart showing a flow of message is between the devices when activating the connection.

Given next is an explanation, referring to a time chart in FIG. 12(*b*), about a case where the user terminal a2 requests the user terminal b1 to set the connection under such a state that the cache connection is stopped in the manner described above.

(1) The protocol control unit 16 in the transmitting-side ATM network device (NWE1) 1*a*, when receiving the connection setting request message (SETUP) transmitted from the user terminal a1, analyzes the connection setting request message in the manner described above, and notifies the connection control unit 14 of the formalized connection setting request message (S100–S102).

In the processes shown in FIG. 5 which are executed in the connection control unit 14, it is not judged that there is made the notification of the connection invalid use (S300), and, because of the received message being the connection setting request message (S302), the connection control unit 14 requests the connection cache unit 12 to allocate the cache connection (S303, S103).

In the processes shown in FIG. 6 which are executed in the connection cache unit 12, the request is to allocate the cache connection (S400), and therefore the connection cache unit 12 retrieves the cache connection data 13 on the basis of the connection information contained in the cache connection allocating request (S401). At this point of time, since the connection used by the user terminal a1 is cached in the connection cache data 13 (S402), the activated state is set in the "active information" field of the relevant connection information, and an address "a2" of the requesting user terminal a2 is set in the "connection originating terminal address" field (S403). Further, the connection cache unit 12 notifies the cell monitoring unit 15 of the VC identifier (VPI=100, VCI=300) of the activated connection (S414). The connection cache unit 12, after activating the cache connection, notifies the connection control unit 14 of a completion of allocating the cache connection (S404). In the processes shown in FIG. 5 which are executed in the connection control unit 14, the notification given from the connection cache unit 12 in response to the cache connection allocation request, is an allocation completion notification (S304), and hence the connection control unit 14 requests the protocol control unit 16 to transmit the cache connection activation request message to the counter-station ATM network device. Moreover, the connection control unit 14 sets within the ATM switch unit 21 the path for the ATM cells coming from the user terminal a2 (S307), and requests the protocol control unit 16 to transmit the connection completion notifying message to the UNI2 (S308, S104).

In the processes shown in FIG. 4 which are executed in the protocol control unit 16, the connection setting completion notifying message is transmitted to the UNI2 without depending on the cache connection linkage information protocol (S203), and hence the protocol control unit 16 generates the connection setting completion notifying message (CONNECT, which contains the notification of the VC identifier used for the allocated connection) in accordance with the DSS2 protocol (S202) and forwards this message (S206, S105). On the other hand, the cache connection activation request message is transmitted based on the cache connection linkage information protocol, and besides the receiving-side user terminal b1 is connected to the counter-station ATM network device (the receiving-side ATM network device 1*b*) incorporating the connection cache function (S203). The protocol control unit 16 therefore generates the cache connection activation request message (including the connection originating terminal address <=a2>, and the remote identification ID <=2>) according to the cache information linkage protocol 18 (S202), and forwards this message (S206, S105).

(2) The cache connection activation request message forwarded from the ATM switch unit 21 in the transmitting-side ATM network device (NWE1) 1*a*, is transmitted to the receiving-side ATM network device (NWE2) 1*b* via the PVC set between the transmitting-side ATM network device (NWE1) 1*a* and the receiving-side ATM network device (NWE2) 1*b*.

(3) The protocol control unit 16 in the receiving-side ATM network device (NWE2) 1*b*, when receiving via the ATM switch unit 21 the cache connection activation request message transmitted via the PVC from the transmitting-side ATM network device (NWE1) 1*a*, formalizes the cache connection activation request message by extracting the necessary information in accordance with the cache information linkage protocol 18 (S201). Then, the protocol control unit 16 notifies the connection control unit 14 of the formalized cache connection activation request message (S205, S102).

In the processes shown in FIG. 5 which are executed in the connection control unit 14, it is not judged that there is made the notification of the connection invalid use (S300), and, because of the received message being the cache connection stop request message (S302), the connection control unit 14 requests the connection cache unit 12 to activate the cache connection (S315, S103).

In the processes shown in FIG. 6 which are executed in the connection cache unit 12, the request is to activate the cache connection (S400), and therefore the connection cache unit 12 retrieves the connection cache data 13 based on the connection originating terminal address and the remote identification ID that are contained in the cache connection activation request. Then, the activated state is set in the "active information" field of the relevant connection information, and the address "a2" of the requesting user terminal a2 is set in the "connection originating terminal address" field (S403). Further, the connection cache unit 12 notifies the cell monitoring unit 15 of the VC identifier (VPI=) 100, VCI=300) of the activated connection (S414).

As the result of the above processes having been thus executed, the connection is established between the transmitting-side user terminal a1 and the receiving-side terminal b1 via the connection remaining set between the transmitting-side ATM network device (NWE1) 1a and the receiving-side ATM network device (NWE2) 1b without requiring a new path for the VC identifier (VPI=100, VCI= 300) within the ATM switch units 21 of both of the ATM network devices 1a, 1b.

Prevention of Invalid Use of Cache Connection

As discussed above, the connection cache unit 12 of each of the ATM network devices 1a, 1b, when activating the cache connection in response to the cache connection allocation request (based on the connection setting request message from the user terminal) given from the connection control unit 14 (S403), notifies the cell monitoring unit 15 of the connection information (the VC identifier) of the connection brought into the activated state (S414). Then, the connection cache unit 12, when stopping the cache connection in response to the cache connection stop request given from the connection control unit 14 (S409), notifies the cell monitoring unit 15 of the connection information (the VC identifier) of the connection brought into the halt state (S416).

In the processes shown in FIG. 8 which are executed in the cell monitoring unit 15, the cell monitoring unit 15, when judging that the same unit 15 is notified of the connection information (the VC identifier) of the activated connection (S600), sets a counted result of the cell counter 17 that corresponds to the notified connection information (S601) as being out of the monitoring target. By contraries, when judged to be notified of the connection information (the VC identifier) of the stopped connection (S600), the cell monitoring unit 15 sets the counted result of the cell counter 17 that corresponds to the notified connection information as a monitoring target (S605).

The cell monitoring unit 15 has a memory containing a list of the VC identifiers in the connection information set as the monitoring target, and monitors the counted result of the cell counter 17 that corresponds to the monitoring target connection information (S602). If the counted result of the cell counter 17 that is set as the monitoring target is not updated, the cell monitoring unit 15 continues to monitor the counted result. If the counted result of the cell counter 17 that is set as the monitoring target is updated (S603), the cell monitoring unit 15 notifies the connection control unit 14 of the invalid use (S604).

In the processes shown in FIG. 5 which are executed in the connection control unit 14, since there is made the judgement of being notified of the connection invalid use (S300), the connection control unit 14 releases the path from the user terminal to the connection using the VC identifier designated in the invalid use notification (S301).

With the above processes executed, the user's invalid use of the cache connection is prevented.

Release of Cache Connection

The connection cache releasing unit 11 extracts a release condition parameter out of the connection cache data 13 in accordance with the processing flow shown in FIG. 8 (S500), and monitors the release condition indicated by the extracted release condition parameter (S501). Then, the connection cache releasing unit 11, if the release condition is not met, continues to monitor the release condition (S502). If the release condition is satisfied (S502), the connection cache releasing unit 11 extracts a releasing method parameter out of the connection cache data 13 (S503). Subsequently, the connection cache releasing unit 11 determines a cache connection conceived as a deletion target in accordance with the releasing method indicated by the extracted releasing method parameter (S504). Then, the connection cache releasing unit 11 requests the connection cache unit 12 and the connection control unit 14 to delete the cache connection determined as the deletion target (S505). Note that the connection cache releasing unit 11 continues the delete request process till all the deletion target connections are deleted (S506).

In the processes shown in FIG. 7 which are executed in the connection cache unit 12, the request given from the connection releasing unit 11 is t o delete the cache connection (S400), and therefore the connection cache unit 12 deletes the cache connection information designated by the connection delete request (S413).

Further, in the processes shown in FIG. 6 which are executed in the connection control unit 14, the request given from the connection releasing unit 11 is to delete the cache connection (S300, S302), and is not the request from the counter-station ATM network device (S317), and therefore the connection control unit 14 requests the protocol control unit 16 to transmit the connection release request message to the NNI2 (S318) and to transmit the cache connection delete request message to the counter-station ATM network device (S319). Then, the connection control unit 14 releases the path of the connection using the VC identifier designated by the release request (S301).

In the processes shown in FIG. 4 which are executed in the protocol control unit 16, the connection release request message is transmitted to the UNI2 without depending on the cache connection linkage information protocol (S203), and hence the protocol control unit 16 generates the connection release request message (RELEASE) in accordance with the B-ISUP protocol 19 with respect to the NNI2 (S202) and forwards this message (S206, S105). On the other hand, the cache connection delete request message is transmitted based on the cache connection linkage information protocol, and besides the receiving-side user terminal b1 is connected to the counter-station ATM network device (the receiving-side ATM network device 1b) incorporating the connection cache function (S203). The protocol control unit 16 therefore generates the cache connection delete request message (including the connection originating terminal address <=a1>, and the local identification ID <=1>) according to the cache information linkage protocol 18 (S202), and forwards this message (S206, S105).

(2) The connection release request message (RELEASE) forwarded to the NNI1 from the ATM switch unit 21 in the transmitting-side ATM network device (NEW1) 1a, is transferred towards the receiving-side ATM network device 1b defined as the counter-station ATM network device while making each ATM switch (with its illustration omitted) in the first ATM network (ATM1) release the connection (SVC).

On the other hand, the cache connection delete request message is transmitted to the receiving-side ATM network device (NWE2) 1b via the PVC set between the transmitting-side ATM network device (NWE1) 1a and the receiving-side ATM network device (NWE2) 1b.

(3) The protocol control unit 16 in the receiving-side ATM network device (NWE2) 1b, when receiving via the ATM switch unit 21 the cache connection delete request message transmitted via the PVC from the transmitting-side ATM network device (NWE1) 1a, formalizes the cache connection delete request message by extracting the necessary information in accordance with the cache information linkage protocol 18 (S201). Then, the protocol control unit 16 notifies the connection control unit 14 of the formalized cache connection delete request message (S205, S102).

In the processes shown in FIG. 5 which are executed in the connection control unit 14, it is not judged that there is made the notification of the connection invalid use (S300), and, because of the received message being the cache connection delete request message (S302, S317), the connection control unit 14 requests the connection cache unit 12 to delete the cache connection (S321, S103).

In the processes shown in FIG. 6 which are executed in the connection cache unit 12, the request is to delete the cache connection (S400), and therefore the connection cache unit 12 retrieves the connection cache data 13 based on the connection originating terminal address and the remote identification ID that are contained in the cache connection activation request. Then, the connection cache unit 12 deletes the relevant connection information (S413).

Thus, the cache connections with smaller necessity for being kept cached are sequentially released in accordance with the "release condition", and consequently the resources of the whole network can be effectively utilized.

<Sole Use of ATM Network Device in Embodiment 1>

The ATM network device (NWE1) 1a in the embodiment 1 can be also solely used. In this case, the connection to be cached is confined within the ATM switch unit 21 in the ATM network device(NEW1) 1a.

There will hereinafter be described a difference between the case of setting, stopping and activating the connection between the user terminals a1, b2, and the case of implementing the cache connection linkage between the user terminals a1, b1.

Setting of Cache Connection

The case where the user terminal a1 sets the connection to the user terminal b2, will be explained with reference to a time chart of FIG. 10(a).

When the ATM network device (NEW1) 1a receives the connection setting request message (CONNECT) from the transmitting-side user terminal a1, as in the same way with the above-mentioned, the connection information is registered in the connection cache data 13 (S406), and the path for the ATM cells from the user terminal a1 is set within the ATM switch unit 21 (S307). Then, thereafter, the protocol control unit 16 is requested by the connection control unit 14 to transmit the cache connection registration request message to the counter-station ATM network device (S306), to transmit the connection setting request message to the NNI2 (S305), and to transmit the connection setting completion notifying message to the UNI1 (S308).

In the processes shown in FIG. 4 which are executed in the protocol control unit 16, the transmissions of the connection setting request message to the NNI2 and of the connection setting completion notifying message to the UNI1 are implemented without depending on the cache connection linkage information protocol (S203), and hence the protocol control unit 16 generates the connection setting request message (IAM) in accordance with the B-ISUP protocol 19 with respect to the NNI1 (S202) and forwards this message (S206, S105). Then, the protocol control unit 16 generates the connection setting completion notifying message (CONNECT, which contains the notification of the VC identifier used for the connection allocated) in accordance with the DSS2 protocol 20 with respect to the UNI1 (S202) and forwards this message (S206, S105). On the other hand, the cache connection registration request message is transmitted based on the cache connection linkage information protocol, but the ATM network device (with the illustration omitted) within the second ATM network (ATM2) connected directly to the user terminal b2 does not incorporate the connection cache function. Hence, the control corresponding to this cache connection registration request message is not performed (S204). Accordingly, the "remote identification ID" of the above connection information remains blank.

(2) The connection setting request messages (IAM) forwarded to the NNI2 from the ATM switch unit 21 in the transmitting-side ATM network device (NWE1) 1a are transferred toward the receiving-side user terminal b2 while making the ATM switches (with their illustrations omitted) within the second ATM network (ATM2) set the connection (SVC).

Stop of Cache Connection

Next, a case where the user terminal a1 finishes the communications and makes the connection release request under such a state that the cache connection is registered in the way described above, will be explained with reference to a time chart of FIG. 11(a).

When the ATM network device (NWE1) 1a receives the connection release request message (RELEASE) from the transmitting-side user terminal a1, as in the above-described case, the halt state is set in the "active information" field of the relevant connection information in the connection cache data 13 (S409). Thereafter, the protocol control unit 16 is requested by the connection control unit 14 to transmit the cache connection stop request message to the counter-station ATM network device (S312) and to transmit the connection release completion notifying message to the UNI1 (S311).

In the processes shown in FIG. 4 which are executed in the protocol control unit 16, the transmission of the connection setting completion notifying message to the NNI1 is implemented without depending on the cache connection linkage information protocol (S203), and hence the protocol control unit 16 generates the connection release completion notifying message (REL COMP) in accordance with the DSS2 protocol 20 (S202) and forwards this message to the UNI1 (S206, S105). While on the other hand, the cache connection stop request message transmission is implemented based on the cache connection linkage information protocol, and the ATM network device (with its illustration omitted) within the second ATM network (ATM2) which is connected directly to the user terminal b2, does not incorporate the connection cache function, so that the control corresponding to this cache connection registration request message is not performed (S204).

Activation of Cache Connection

Given next is an explanation, referring to a time chart in FIG. 12(a), about a case where the user terminal a2 requests the user terminal b2 to set the connection under such a state that the cache connection is halted in the manner described above.

When the ATM network device (NWE1) 1a receives the connection setting request message (CONNECT) from the transmitting-side user terminal a2, as in the above-described case, the activated state is set in the "active information" field of the relevant connection information in the connection cache data 13 (S409). Then, the protocol control unit 16 thereafter is requested by the connection control unit 14 to transmit the cache connection activation request message to the counter-station ATM network device (S309) and to transmit the connection setting completion notifying message to the UNI1 (S308).

In the processes shown in FIG. 4 which are executed in the protocol control unit 16, the transmission of the connection setting completion notifying message to the NNI1 is implemented without depending on the cache connection linkage information protocol (S203), and hence the protocol control unit 16 generates the connection setting completion notifying message (CONNECT, which is contains the notification of the VC identifier used for the allocated connection) in accordance with the DSS2 protocol 20 (S202) and forwards this message to the UNI1 (S206, S105). While on the other hand, the transmission of the cache connection activation request message transmission is implemented based on the cache connection linkage information protocol, and the ATM network device (with its illustration omitted) within the second ATM network (ATM2) which is connected directly to the user terminal b2, does not incorporate the connection cache function, so that the control corresponding to this cache connection registration request message is not performed (S204).

Release of Cache Connection (1) The connection cache releasing unit 11, as described above, requests the connection cache unit 12 and the connection control unit 14 to delete the cache connection determined as a deletion target (S505). Thereafter, the connection cache unit 12 deletes the cache connection information designated by the connection cache releasing unit 11 (S413). The connection control unit 14 requests the protocol control unit 16 to transmit the connection release request message to the NNI2 (S318) and to transmit the cache connection delete request message to the counter-station ATM network device (S319), and releases the path from the user terminal to the connection using the VC identifier designated by the release request (S301).

In the processes shown in FIG. 4 which are executed in the protocol control unit 16, the transmission of the connection release request message to the NNI2 is implemented without depending on the cache connection linkage information protocol (S203), and hence the protocol control unit 16 generates the connection release request message (RELEASE) in accordance with the B-ISUP protocol 19 (S202) and forwards this message to the UNI2 (S206, S105). While on the other hand, the transmission of the cache connection delete request message transmission is implemented based on the cache connection linkage information protocol, and the ATM network device (with its illustration omitted) within the second ATM network (ATM2) which is connected directly to the user terminal b2, does not incorporate the connection cache function, with the result that the control corresponding to this cache connection delete request message is not performed (S204).

(2) The connection release request messages (RELEASE) forwarded to the NNI2 from the ATM switch unit 21 in the transmitting-side ATM network device (NWE1) 1a are transferred toward the receiving-side user terminal b2 while releasing the connection (SVC) with respect to the ATM switches (with their illustrations omitted) within the second ATM network (ATM2).

Second Embodiment

A second embodiment of the present invention is different from the first embodiment discussed above in terms of only a data structure of the cache connection data 13. Other constructions in the second embodiment are absolutely the same as those in the first embodiment discussed above, and hence the explanations thereof are omitted.

Figure 13:
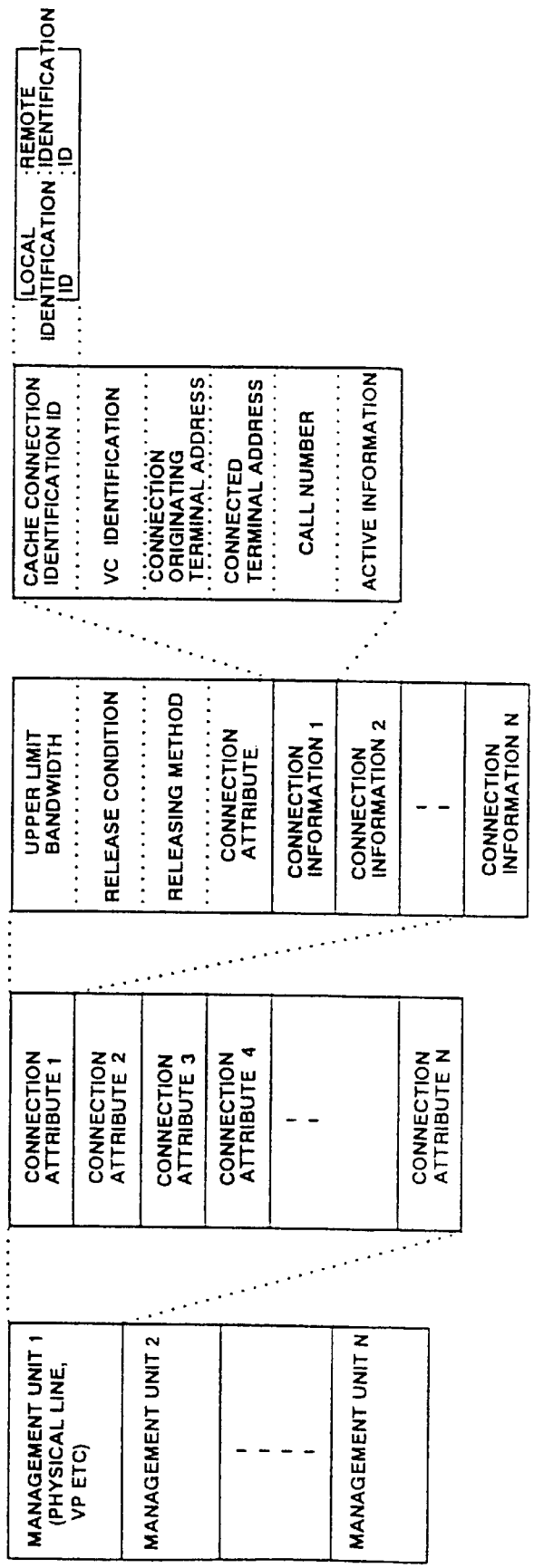
FIG. 13 is a diagram showing a data structure of connection cache data in a second embodiment of the present invention.

The connection cache data 13 in the second embodiment roughly consists of, as shown in FIG. 13, a plurality of management unit blocks. These management unit blocks are prepared based on the unit of the physical line or the VP (Virtual Path). In an example in FIG. 13, the management unit blocks are prepared on the unit of physical line of each of the NNI1 and NNI2, or on the unit of VP set in each NNI.

Each management unit block comprises a multiplicity of connection attribute areas. Herein, the connection attribute is a combination of a class of QOS (which is a range of assuring a quality of service), an ATM transfer capability (a distinction between a request bandwidth assurance type, a best-effort type etc) and a size of the bandwidth to be used.

Each connection attribute area comprises an upper limit bandwidth parameter for indicating an upper limit of a total sum of bandwidths (i.e., a total sum of bandwidths corresponding to the number of pieces of registrable connection information) able to be cached with respect to the connections having the connection attribute thereof, a release condition parameter, a releasing method parameter, a connection attribute parameter for indicating the above connection attribute, and connection information on a multiplicity of connections having this connection attribute. Note that the items contained in the connection information are the same as those in the first embodiment.

If constructed in this way, the upper limit bandwidth, the release condition and the releasing method can be designated corresponding to each connection attribute, and it is therefore feasible to judge more minutely per connection attribute whether or not the cache connection can be set (S405) and whether or not the cache connection can be released (S502). Accordingly, the resources of the whole network can be utilized more effectively.

To be specific, the connection cache unit 12, on the occasion of registering a new cache connection in S406, reads a size of the using bandwidth in the connection attribute, a value of the upper limit bandwidth parameter and the number of registered pieces of connection information out of the connection attribute area corresponding to the connection attribute of a target connection. Then, the connection cache unit 12 registers the cache connection as far as a product of the size of the using bandwidth and the number of registered pieces of connection information is smaller than the upper limit bandwidth.

Further, connection cache releasing unit 13 reads the release condition different per connection attribute (S500), and monitors the cache connections each having the connection attribute in accordance with the release conditions set respectively (S501). Subsequently, if there is the cache connection satisfying the release condition prepared individually (S502), this cache connection is released according to the release condition corresponding to that connection attribute (S503–S506).

With the above processes effected, for example, when using communications types of a narrow bandwidth/low-quality connection attribute used for ordinary data communications and of a broad bandwidth/high-quality connection attribute for a flow of a video/voice stream, it is possible to set the upper limit bandwidth for the data communications large and set the number of releases in case of deficient bandwidth large, and to set the upper limit bandwidth for the stream communications small and set the number of releases in case of deficient bandwidth small. With this contrivance, there can be conducted such an operation that connections for the data communications as large number as possible is cached within the remaining bandwidth while ensuring the bandwidth for the stream connection.

Third Embodiment

A third embodiment of the present invention is, as compared with the first embodiment discussed above, characterized in that the connection setting request is not allocated with the cached SVC but allocated with the PVC set between the ATM network device and the connected terminal (or the counter-station ATM network device).

Figure 14:
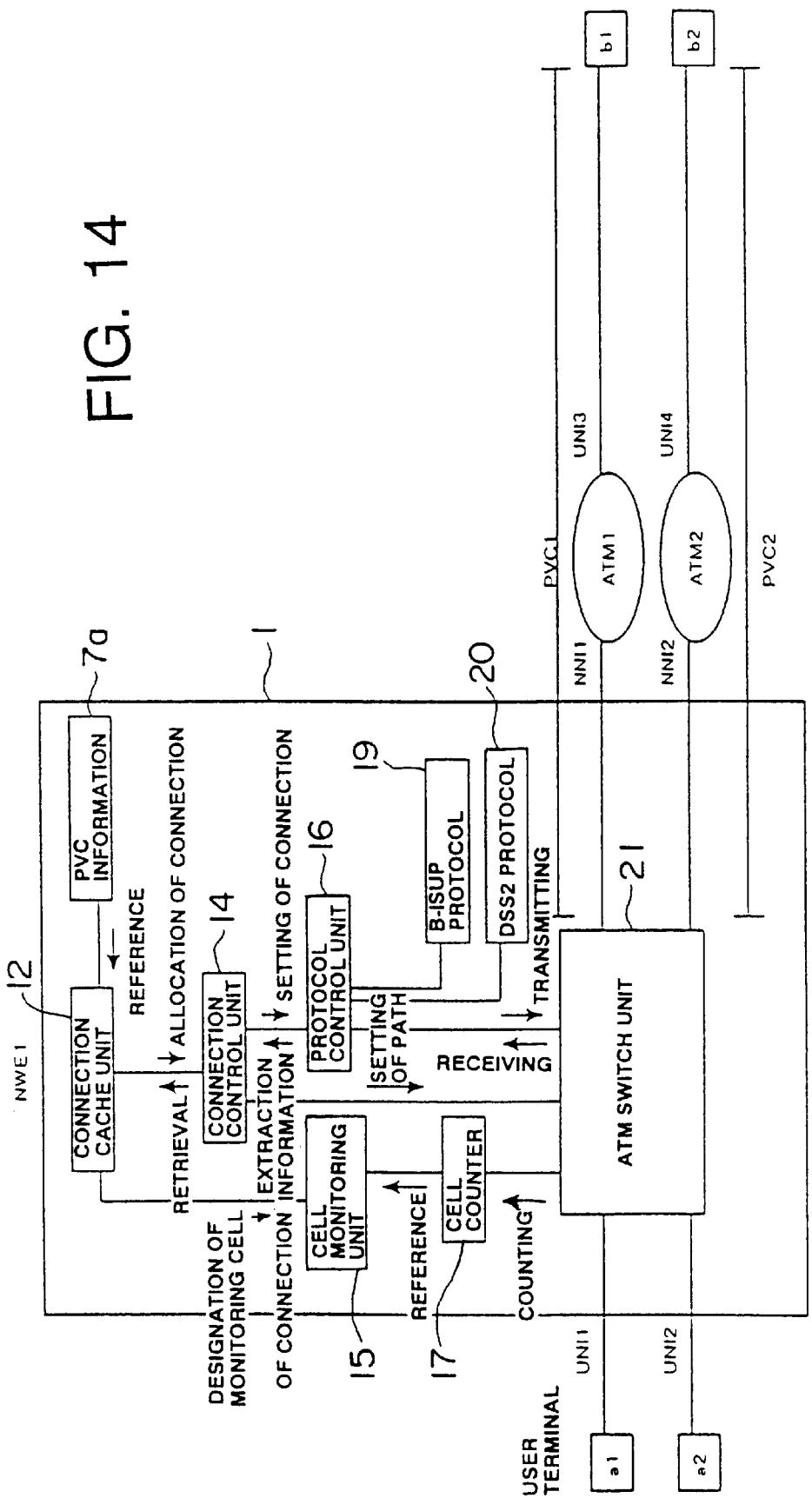
FIG. 14 is a block diagram showing functions actualized by a program within the ATM network device in a third embodiment of the present invention.

Accordingly, as shown in FIG. 14, the ATM network device 1 in the third embodiment has, in comparison with the ATM network device 1 in the first embodiment, such differences that PVC information 7a is prepared as a substitute for the cache connection data 13, that there is no connection cache releasing unit 11, that the protocol control unit 16 is not provided with the cache information linkage protocol 18, and that the processing executed by the connection cache unit 12 is different therefrom. Other constructions in the ATM network device in the third embodiment are the same as those in the ATM network device in the first embodiment, and hence the explanations thereof are omitted.

Figure 15:
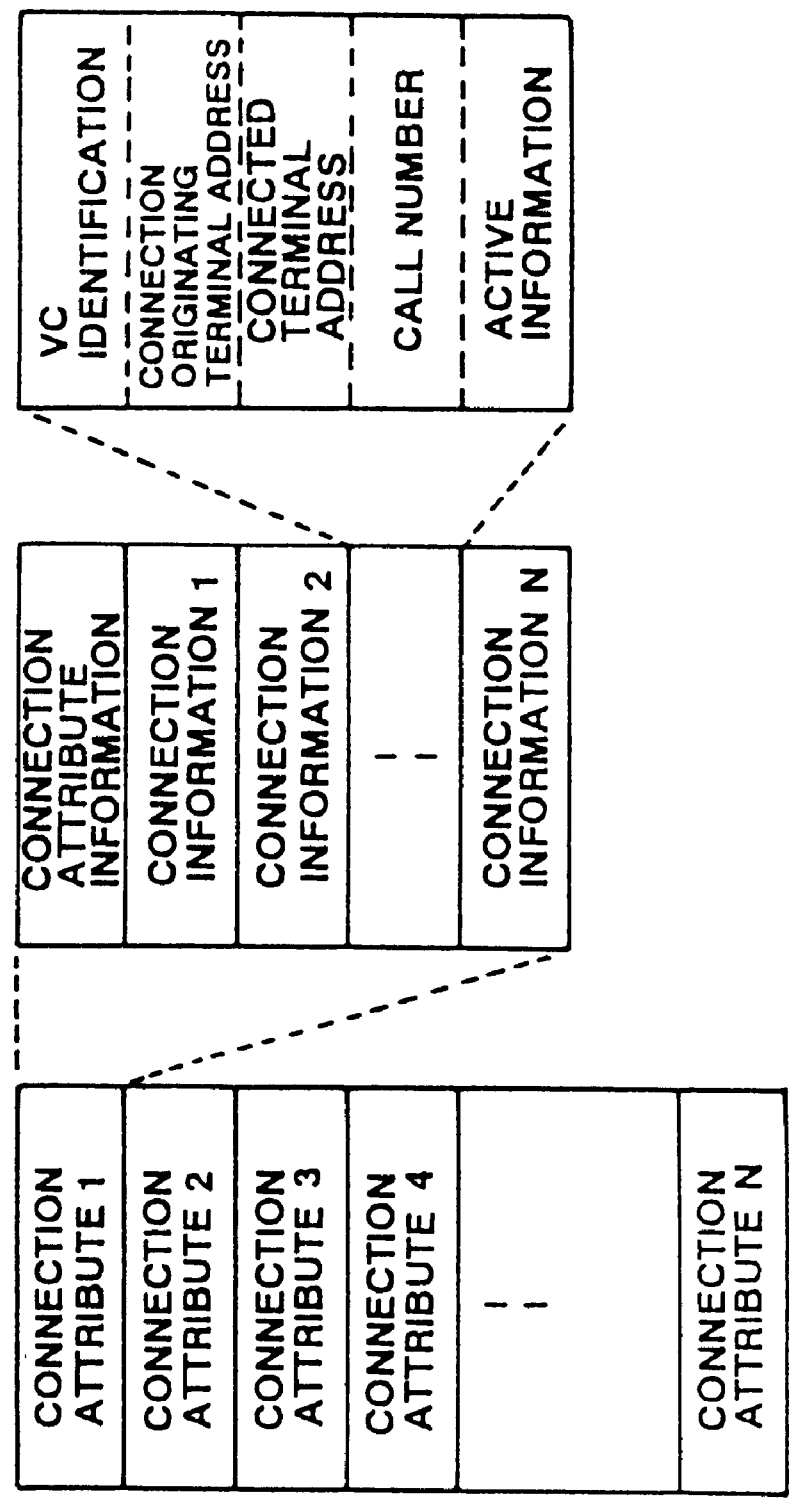
FIG. 15 is a diagram showing a data structure of PVC information in FIG. 14.

FIG. 15 shows a structure of the PVC information 7a. As shown in FIG. 15, the PVC information 7a is constructed roughly of a multiplicity of connection attribute areas. Herein, the connection attribute is a combination of a class of QOS (which is a range of assuring a quality of service), an ATM transfer capability (a distinction between a request bandwidth assurance type, a best-effort type, etc.) and a size of the bandwidth to be used.

Each connection attribute area comprises a connection attribute parameter for indicating the connection attribute and connection information on the multiplicity of connections each having the connection attribute.

Each piece of connection information is constructed of a VC identifier used for the PVC conceived as a management target of the piece of connection information, an address (a connection originating terminal address) of the connection originating user terminal to which this PVC is allocated, an address (a connected terminal address) of the connected user terminal based on this PVC, a call number, and activation information.

In an example shown in FIG. 14, the PVC information 7a is stored with the connection information for managing a PVC1 set to the NNI1 of the ATM switch unit 21 led to the user terminal b1, and with the connection information for managing a PVC2 set to the NNI2 of the ATM switch unit 21 led to the user terminal b2.

Figure 16:
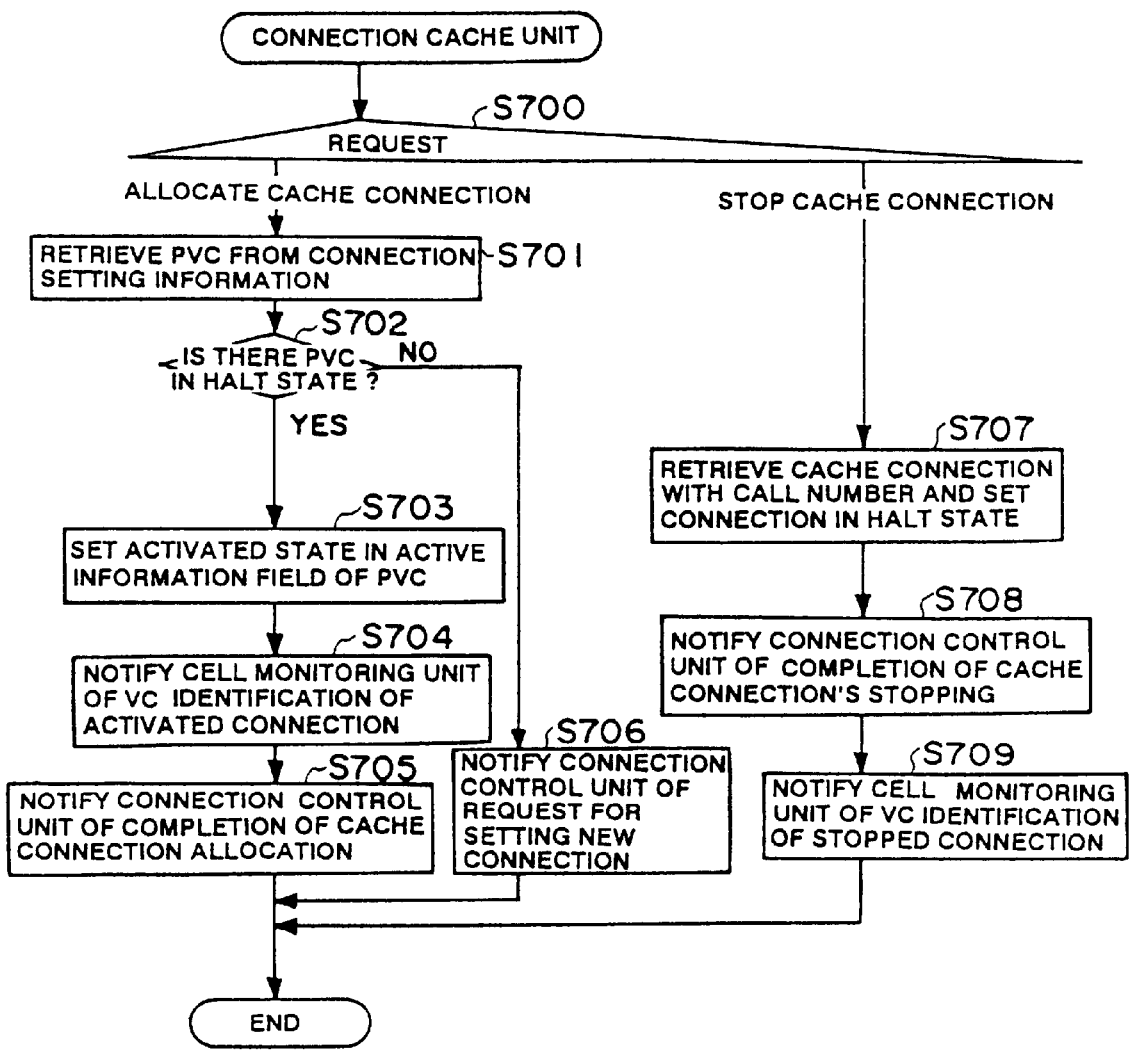
FIG. 16 is a flowchart showing a content of processing by the connection cache unit in FIG. 14.

The connection cache unit 12 referring to the PVC information 7a executes, to be specific, processes according to a flowchart of FIG. 16. The processes in FIG. 16 start when the connection cache unit 12 receives the requests (the connection allocation request <S303>, and the cache connection stop request <S310>) from the connection control unit 14.

Then, in first step S700, the connection cache unit 12 judges which request is received. The connection cache unit 12, when receiving the cache connection allocation request, advances the processing to S701 and, when receiving the cache connection stop request, diverts the processing to S707.

In S701, the connection cache unit 12 retrieves a connection attribute area which corresponds to the connection attribute of the connection of which the allocation is requested) in the PVC information 7a, and thus searches for the connection information in which the halt state is set in the "active information" field.

In next step S702, the connection cache unit 12 checks based on a retrieved result in S401 whether or not there is the connection information of the PVC remaining in the halt state. If there is the connection information of the PVC remaining in the halt state, the connection cache unit 12 specifies in S703 one piece of connection information in which the halt state is set in the "active information" field, then sets the activated state in the "active information" field of the specified connection information, and overwrites values in the connection allocation request to the "call number" field, the "connection originating terminal address" field and the "connected terminal address" field, respectively.

In next step S704, the connection cache unit 12 notifies the cell monitoring unit 15 of the connection information (the VC identifier) in which the activated state is set in the "active information" field thereof in S402.

In next step S705, the connection cache unit 12 notifies the connection control unit 14 of a completion of having allocated the cache connection. This allocation completion notification contains a content of the connection information in which the activated state is set in the "active information" field in S703. After a completion of the process in S705, the processing by the connection cache unit 12 is ended.

By contraries, when judging in S702 that there is not the connection information of the PVC remaining in the halt state, the connection cache unit 12 advances the processing to S706. In S706, the connection cache unit 12 requests the connection control unit 14 to set a new connection. After a completion of the process in S706, the processing by the connection cache unit 12 is finished.

On the other hand, in S707, the connection cache unit 12 retrieves the PVC information on the basis of the connection originating terminal address, the connected terminal address, the call number and the connection attribute which are contained in the cache connection stop request, and sets the halt state in the "active information" field in the relevant connection information.

In next step S708, the connection cache unit 12 notifies the connection control unit 14 of the completion of having stopped the cache connection. This cache connection stop completion notification contains a content of the connection information in which the halt state is set in the "active information" field in S707.

In next step S709, the connection cache unit 12 notifies the cell monitoring unit 15 of the connection information (the VC identifier) in which the halt state is set in the "active information" field thereof in S707. After a completion of the process in S709, the processing by the connection cache unit 12 is ended.

(Operation of ATM Network Device)

Next, an operation of the thus constructed ATM network device will be explained. It is assumed as an explanatory premise that, as shown in FIG. 14, the user terminals a1, a2 be connected directly to the ATM network device (NWE1) 1. It is also presumed that an interface of the ATM network device (NWE1) 1 to the user terminal a1 be designated by UNI1, and an interface to the user terminal a2 be designated by UNI2. It is further assumed that the user terminal b1 be connected to the ATM network device (NWE1) 1 via the first ATM network (ATM1), and the user terminal b2 be connected thereto via the second ATM network (ATM2). It is presumed that an interface of the ATM network device (NWE1) 1 to the first ATM network (ATM1) be denoted by NNI1, and an interface to the second ATM network (ATM2) be denoted by NNI2. It is still further assumed that an interface leading from the first ATM network (ATM1) to the user terminal b1 be designated by UNI3, and an interface leading from the second ATM network (ATM2) to the user terminal b2 be denoted by UNI4.

Activation of Connection

At first, a case where the user terminal a1 requests the user terminal b2 to set the connection, will be explained.

The protocol control unit 16 in the ATM network device (NWE1) 1, when receiving the connection setting request message (SETUP) transmitted from the user terminal a1 via the UNI1 and the ATM switch unit 21, formalizes the connection setting request message (SETUP) by extracting the connection setting information according to the DSS2 protocol 20. Then, the protocol control unit 16 notifies the connection control unit 14 of the formalized connection setting request message. The connection control unit 14 notified of the connection setting request message requests the connection cache unit 12 to allocate the cache connection. It is to be noted that this cache connection allocation request contains the connection originating terminal address, the connected terminal address, the call number and the connection attribute in the connection setting request message.

The connection cache unit 12 retrieves the PVC information 7a in accordance with the retrieval condition included in the cache connection allocation request given from the connection control unit 14 (S701). Then, the connection cache unit 12 confirms whether or not the halt state is set in the "active information" field of the connection information on the PVC1 coincident with the retrieval condition (S702) and, if the halt state is set, after setting the activated state in the "active information" field of the relevant connection information (S703), notifies the connection control unit 14 of the completion of the connection (S705).

The connection control unit 14 sets within the ATM switch unit 21 a path for transmitting the ATM cells from the user terminal a1 via the NNI1 to the PVC1, and requests the protocol control unit 16 to transmit the connection setting completion notifying message to the UNI1.

The protocol control unit 16, of which the transmission of the connection setting completion notifying message is requested, generates the connection setting completion notifying message (CONNECT, which contains the notification of the VC identifier used for the allocated connection) according to the DSS2 protocol 20, and forwards this message to the UNI1.

Stop of Connection

Given next is a description of a case in which the user terminal a1 finishes the communications and makes a connection release request under such a state that the PVC is thus activated.

The protocol control unit 16 in the ATM network device (NWE1) 1, when receiving the connection release request message (RELEASE) transmitted from the user terminal a1, formalizes the connection release request message (RELEASE) by extracting the connection setting information according to the DSS2 protocol 20. Then, the protocol control unit 16 notifies the connection control unit 14 of the formalized connection release request message. The connection control unit 14 notified of the connection release request message requests the connection cache unit 12 to stop the cache connection. It is to be noted that this cache connection stop request contains the connection originating terminal address, the connected terminal address, the call number and the connection attribute in the connection stop request message.

The connection cache unit 12 retrieves the PVC information 7a in accordance with the connection attribute and the call number which are contained in the cache connections stop request given from the connection control unit 14 (S701). Then, the connection cache unit 12 sets the halt state in the "active information" field of the connection information on the PVC1 coincident with the retrieval condition (S707) and, notifies the connection control unit 14 of the completion of having stopped the connection (S708).

The connection control unit 14 requests the protocol control unit 16 to transmit the connection release completion notifying message in order to notify the user terminals of the release completion via the UNI interface.

The protocol control unit 16 accepting the request for transmitting the connection release completion notifying message, referring to. the DSS2 protocol 20, generates the connection release completion notifying message, and sends this message to the UNI1.

With the above processes executed, according to the ATM network device in the third embodiment, the existing PVC can be utilized as a cache connection, and the plurality of user terminals are capable of sharing with the same PVC, and hence there might be decreased such troublesomeness that the PVC must be reset over the plurality of nodes by an end node executing the adding/deleting process of the user terminal.

According to the thus constructed ATM network device of the present invention, the resources of the whole network can be effectively utilized by releasing the connections when the traffic congestion is small, and besides, even if the request for setting the connections having absolutely the same attribute is repeated any number of times, the overhead time can be reduced.

A wide range of different working modes can be formed based on the present invention without deviating from the spirit and scope of the present invention. The present invention, therefore, is not restricted by its specific working modes except being limited by the appended charges.

The present invention is not limited to the embodiments described above, but also encompasses variations thereof.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An ATM network device comprising:
   an ATM switch unit in which a connection for transmitting an ATM cell having a specified identifier through a predetermined interface is set;
   a message receiving unit for receiving via said ATM switch unit a call control signaling message transmitted from outside;
   a connection information retaining unit for retaining, per connection, connection information which specifies the connection set in said ATM switch unit and having a connection attribute, and indicates whether the specified connection is in an activated state or in a halt state;
   a connection management unit which makes, when a call control signaling message received by said message receiving unit indicates a request to release the connection from a call, a change so that the connection information specifying the connection of which release is requested indicates the halt state while the connection is maintained in said ATM switch, and which makes, when a call control signaling message received by said message receiving unit indicates a request to set a connection for another new call having a corresponding connection attribute, a change so that any piece of connection information indicating the halt state indicates the activated state, and thereby allocating the existing connection to the new call indicated by the request to set a connection.

2. An ATM network device according to claim 1, wherein the connection information indicates an identifier used for the specified connection, and said connection management unit allocates the connection to the new call by imparting the identifier used for the connection to the ATM cell belonging to the call.

3. An ATM network device according to claim 1, wherein said connection management unit, if there is no connection information indicating the halt state when the call control message received by said message receiving unit indicates the request to set the connection for the new call, sets a new connection in said ATM switch unit, and allocates this new connection to the call.

4. An ATM network device according to claim 3, wherein said connection management unit, when newly setting the connection in said ATM switch unit, registers said connection information retaining unit with new connection information specifying the newly set connection.

5. An ATM network device according to claim 4, wherein said connection information retaining unit further retains upper limit bandwidth information defining an upper limit of a total sum of bandwidths of all the connections specified by the respective retained pieces of connection information, and said connection management unit registers said connection information retaining unit with the connection information specifying the newly set connection as far as the total sum of bandwidths of all the connections specified by the respective pieces of connection information retained by said connection information retaining unit, falls within the upper limit defined by the upper limit bandwidth information.

6. An ATM network device according to claim 4, wherein each piece of connection information indicates an attribute of the specified connection, said connection information retaining unit further retains per classification of the attribute the upper limit bandwidth information defining the upper limit of the total sum of bandwidths of the connections specified by the respective retained pieces of connection information, and said connection management unit registers said connection information retaining unit with the connection information specifying the newly set connection as far as the total sum of bandwidths of the connections specified by the connection information indicating the same attribute as that of the newly set connection, falls within the upper limit defined by the upper limit bandwidth information on this attribute.

7. An ATM network device according to claim 1, wherein said connection information retaining unit further retains release condition information indicating a condition for releasing the connection specified by the retained piece of connection information, and said connection management unit deletes any one piece of connection information out of said connection information retaining unit in accordance with the condition indicated by the release condition information.

8. An ATM network device according to claim 1, wherein each piece of connection information indicates an attribute of the specified connection, said connection information retaining unit further retains per classification of the attribute the release condition information for indicating a condition for releasing the connection specified by the retained piece of connection information, and said connection management unit deletes any one piece of connection information out of said connection information retaining unit in accordance with the condition indicated by the release condition information.

9. An ATM network device according to claim 1, wherein said connection management unit, after said message receiving unit has received the call control signaling message indicating a request to release a connection from a call, and when the ATM cell belonging to this call flows into said ATM switch unit, releases the connection having been allocated to this call.

10. An ATM network device according to claim 1, wherein the connection set in said ATM switch unit is a permanent virtual channel set between two ATM networks.

11. An ATM network device according to claim 1, wherein the connection set in said ATM switch unit is a switched virtual channel set with respect to other ATM network.

12. An ATM network device according to claim 11, further comprising:

a message transmitting unit for transmitting a message requesting said connection management unit of said other ATM network device to change, when said connection management unit has changed a connection information for specifying a connection so as to indicate the halt state, a connection information specifying the connection so as to indicate the halt state, and transmitting a message requesting said connection management unit of said other ATM network device to change, when said connection management unit has changed a connection information for specifying a connection so as to indicate the activated state, a connection information for specifying the connection so as to indicate the activated state.

* * * * *